United States Patent [19]
Shimizu et al.

[11] Patent Number: 5,482,625
[45] Date of Patent: Jan. 9, 1996

[54] FILTRATION MEMBRANE MODULE

[75] Inventors: Kenji Shimizu; Hiroshi Ishida; Yutaka Yamada; Kiyoshi Izumi; Masashi Moro; Yuji Soeda, all of Osaka, Japan

[73] Assignee: Kubota Corporation, Osaka, Japan

[21] Appl. No.: 309,246

[22] Filed: Sep. 20, 1994

[30] Foreign Application Priority Data

| Jan. 7, 1994 | [JP] | Japan | 6-000352 |
| Jan. 7, 1994 | [JP] | Japan | 6-000353 |
| Apr. 13, 1994 | [JP] | Japan | 6-073673 |

[51] Int. Cl.⁶ .................................................. B01D 63/00
[52] U.S. Cl. ...................... 210/321.84; 210/321.75; 210/231; 210/232; 210/484; 210/488; 210/489; 210/346
[58] Field of Search ............... 210/321.84, 321.75, 210/224, 231, 232, 486, 489, 500.21, 226, 228, 346, 459, 462, 256, 488, 323.2, 416.1, 484, 323.1

[56] References Cited

U.S. PATENT DOCUMENTS

| 1,724,436 | 8/1929 | Sweetland | 210/323.2 |
| 3,679,059 | 7/1972 | Wyatt et al. | 210/321.84 |
| 4,832,841 | 5/1989 | Gutman et al. | 210/232 |
| 4,871,456 | 10/1989 | Naruo et al. | 210/321.84 |
| 5,192,456 | 3/1993 | Ishida et al. | 210/321.75 |

Primary Examiner—Ana M. Fortuna
Attorney, Agent, or Firm—Barnes, Kisselle, Raisch, Choate, Whittemore & Hulbert

[57] ABSTRACT

A filtration membrane module submerged with processed liquid in the processing tank. Plural plate-like, rigid membrane cartridges are vertically placed in parallel to each other as properly spaced from the adjoining membrane cartridges. The cleaning stream generating means for supplying a flow parallel to the membrane surfaces of the membrane cartridges opposes the gaps between the membrane cartridges opposite to each other. The sucking means for sucking the permeated liquid in each membrane cartridge is communicated with each passage of permeated liquid in each membrane cartridge. The membrane supporting plate for retaining the filtration membrane of the membrane cartridge is made hollow using a rigid structure member.

9 Claims, 27 Drawing Sheets

5,482,625

FILTRATION MEMBRANE MODULE

FIELD OF THE INVENTION

The present invention relates to a filtration membrane module used for sanitary sewage process such as activated sludge process, flocculent separation process.

BACKGROUND OF THE INVENTION

A conventional submerged filter system for purification of sewage comprises a filtration membrane module 1 shown in FIG. 1. The filtration membrane module 1 is submerged in a processing tank 2 and has a filtration unit 3. The filter unit 3 comprises an upper casing 4 and plural membrane cartridges 5. The upper casing is in the form of box, opening at the top and bottom thereof. The upper casing 4 accommodates plural membrane cartridges 5 vertically placed in parallel to each other as properly spaced from the adjoining membrane cartridges 5. The gaps between the membrane cartridges 5 form passages. The membrane cartridge 5 comprises a flat filter plate, whose surface is covered with filtration membrane. The filter plate of the membrane cartridge 5 includes a sump for collecting permeated liquid through the filtration membrane, and the sump forms a part of the passage of permeated liquid in the membrane cartridge 5.

A lower casing 6 continuous to the upper casing 4 includes a diffuser 7 therein, which spurts upward an aeration gas A including oxygen and air supplied from a source. The aeration gas spurted from the diffuser 7 generates an upward flow due to an air lift effect, making a gas-liquid cross flow along the surface of the membrane cartridges 5 adjoining each other.

An end of a suction pipe 8 communicates with a liquid collecting pipe 9a, which communicates through a flexible suction tube 9b with the passages of permeated liquid defined between the respective membrane cartridges 5. The other end of the suction pipe 8 is connected to the suction side of a sucking pump 10, while the discharge side of the sucking pump 10 is connected to a discharge pipe 11.

In processing, the sucking pump 10 is driven to apply a sucking pressure to the passages of permeated liquid between the membrane cartridges 5, thereby filtering the processed liquid. The permeated liquid through the filtration membrane is sucked by the sucking pump 10 through the suction tube 9b, liquid collecting pipe 9a and suction pipe 8, and is supplied to the following system through the discharge pipe 11.

In this process, a gas-liquid upward flow B flows as a cleaning stream along the membrane surfaces of the passages between the respective membrane cartridges 5, thereby restraining the adhesion of cake layers to the membrane surfaces.

Since the conventional membrane cartridge 5 employs a solid-core matter for the filter plate, a thin layer is formed in the passage of permeated liquid between the filtration membrane and on the surface of the filter plate, causing a flow resistance to grow. Because of the thin layer so formed, the transmembrane pressure is not applied evenly to the whole surface of the filtration membrane of the membrane cartridge 5. Accordingly, the transmembrane pressure concentrates on the vicinity of the sump communicated with the suction tube 9, so that the filtration is localized around the sump. If the filtration is localized at some part of the filtration membrane, the fouling at the part grows faster.

As shown in FIG. 2, the aeration gas spurted from a diffusing port 7a at the upper part of the diffuser 7 goes up as spreading far and wide, and flows as mixed with the processed liquid entering from the lower opening of the lower casing 6. However, if a distance between the lower end of the membrane cartridges 5 and the diffuser 7 is as short as less than 500 mm, the aeration gas will not fully spread and so the gas-liquid upward flow will be localized around the central part of the membrane cartridges 5. Further, a part of the gas-liquid upward flow collides the lower end of the membrane cartridges 5, flowing horizontally to collide the lower casing 8, thus ending up in a swirl. Due to the effect of the swirl, the flow rate of the gas-liquid cross flow between the membrane cartridges 5, becomes higher at the central part of the membrane cartridges and lower at the peripheral part thereof. Consequently, the cake layer is localized at peripheral part of the filtration membrane, and therefore the cleaning effect of the gas-liquid cross flow is not evenly utilized, causing the cake layer to grow faster.

DISCLOSURE OF THE INVENTION

For solving aforesaid problems, the present invention has an object to provide a filtration membrane module which allows to apply the sucking pressure evenly to the whole surface of the filtration membranes of the membrane cartridges and to equalize the cross flow velocity in gaps between the membrane cartridges, thereby eliminating the localization of the fouling and the cake layer.

To achieve the above objects, a filtration membrane module according to the present invention comprises a Filtration membrane module submerged with a processed liquid in a processing tank; plural plate-like membrane cartridges having rigidity which are vertically placed in parallel to each other and properly spaced from the adjoining membrane cartridges; cleaning stream generating means for producing a flow parallel to the membrane surfaces of the membrane cartridges, which opposes to gaps between the membrane cartridges opposing to each other; suction means for sucking a permeated liquid from the membrane cartridges, which is communicated with the passages of permeated liquid of membrane cartridges; and a membrane supporting plate for retaining the filtration membrane of the membrane cartridge which is made hollow using a rigid structure member.

In aforesaid filtration membrane module according to the present invention, the hollow portion of the membrane supporting plate defines a passage of permeated liquid of broad width and low flow resistance because the membrane supporting plate is made hollow by the structure member. Accordingly, the sucking pressure from the sucking means is applied evenly to the whole surface of the filtration membrane of the membrane cartridge. Thus the localization of the fouling on the filtration membrane is avoided.

Because of plate-like membrane cartridges having rigidity, the passage formed in a gap between the membrane cartridges opposing to each other maintains a uniform passage width at all time, and the cross flow along the membrane surface generated by the cleaning stream feeding means flows evenly across the entire section of the membrane module. Thus the effect of the cleaning stream is evenly utilized to restrain the growth of the cake layer and to increase the filtration length.

A more preferable arrangement of the filtration membrane module according to the present invention is arranged such that a membrane cartridge comprises a membrane supporting plate composed of a rigid frame structure; a filtration membrane covering the openings of the membrane supporting plate; and a membrane supporting net interposed between the membrane supporting plate and filtration membrane.

This arrangement is advantageous in that because the membrane supporting plate is made of the frame structure, the passage of permeated liquid defined by the hollow portion has a large opening area relative to the filtration membrane, the localization of the fouling on the membrane is avoided and a high permeate flux is assured by the reduction of the pressure loss through the hollow portion. Further, the use of the frame structure facilitates the defining of a sufficient space in the membrane supporting plate. Should breed microorganisms in the membrane supporting plate, such microorganisms will not close the passage of permeated liquid.

Another preferable arrangement of the filtration membrane module according to the present invention is arranged such that a membrane cartridge comprises a membrane supporting plate as a frame structure divided into two frame bodies made of molded synthetic resin; protrusions provided on the opposing surface of one of said two frame bodies opposite to each other; recesses provided on the opposing surface of the other frame body; and a filtration membrane covering the outer surface of each frame body which is integrally formed therewith, said protrusions and recesses being fit with each other to fix the frame bodies to each other.

This arrangement, in which a pair of the frame bodies covered with the filtration membrane are fixed to each other by fitting the protrusions and recesses with each other, facilitates the disassembly/assembly of the membrane cartridge as well as the cleaning of the filtration membrane in maintenance works.

Another preferable arrangement of the filtration membrane module according to the present invention is arranged such that the frame body of a membrane supporting plate includes bars for supporting a filtration membrane, and that the bars include holes for defining the passage of permeated liquid.

This arrangement is advantageous in that since the bars of the membrane supporting plate has holes for forming the passage of permeated liquid, the permeated liquid may be drawn out through the passage in the bars while the filtration membrane is supported by the bars when the sucking pressure is applied.

Another preferable arrangement of the filtration membrane module according to the present invention is arranged such that a membrane cartridge comprises a bag-shaped filtration membrane covering a membrane supporting plate; the membrane supporting plate including plural bar-like, rigid membrane supporting frame members arranged in parallel to each other; a coupling frame member disposed as crossed with ends of the membrane supporting frame members to fix the same in one piece; passages of permeated liquid formed in gaps between the respective membrane supporting frame members; and a liquid collecting cap communicated with a liquid collecting means and coupled with the other ends of the membrane supporting frame members.

This arrangement is advantageous in that because the permeated liquid flows between the respective membrane supporting frame members composing the membrane supporting plate and then to the liquid collecting cap, the flow resistance is low, thus the localization of the fouling is avoided and a high permeate flux is assured.

Another preferable arrangement of the filtration membrane module according to the present invention is arranged such that a liquid collecting cap is detachably coupled to the other ends of the respective membrane supporting fame members.

This arrangement is advantageous in that because the liquid collecting cap is detachable, the liquid collecting cap is removed from the membrane supporting frame members to replace the filtration membrane to a new one such that the membrane supporting plate may be put to reuse.

Another preferable arrangement of the filtration membrane module according to the present invention is arranged such that a membrane cartridge comprises a pair of plate members with fine apertures or slits disposed therein being coupled to each other on the peripheries thereof so as to form a hollow membrane supporting plate; plural plate-like rib members having a width bridging the two plate members, which are disposed in parallel to each other in the membrane supporting plate; and passages of permeated liquid formed between the respective rib members.

In this arrangement, the permeated liquid through the filtration membrane enters the inside of the hollow membrane supporting plate through the fine apertures or slits in the plate members, flowing through the passages of permeated liquid defined between the respective rib members supporting the plate members and is drawn out of the membrane cartridge. Since the membrane supporting plate is made hollow, the sectional area of the passage of permeated liquid is large and the permeated liquid flows through the passage at lower flow resistance, thereby avoiding of the localization of the fouling and attaining a high permeate flux and a long filtration length. Since the rib members support the hollow membrane supporting plate from the inside thereof to prevent the deformation of the membrane supporting plate, a large filtration membrane module can be made not suffering any change in the thickness of the membrane cartridge. Consequently this arrangement evenly effects the whole surface of the filtration membrane to clean the deposit thereon.

Another preferable arrangement Of the filtration membrane module according to the present invention comprises a spacer interposed between plate members of a membrane supporting plate and a filtration membrane to form a predetermined gap therebetween; and fine grooves communicated with fine apertures or slits formed in the surfaces of the plate members.

This arrangement is advantageous in that the passage of permeated liquid between the plate members and filtration membrane is expanded in width by the spacer and fine grooves such that the flow resistance in the passage of permeated liquid is reduced even further.

Another preferable arrangement of the filtration membrane module according to the present invention comprises a diffuser serving as a cleaning stream generating means which is disposed under membrane cartridges; diffusing ports disposed at a lower side of the diffuser; and the membrane cartridge including edge supporting members disposed at opposite end portions of the membrane supporting plate and forming a predetermined gap between the filtration membranes of adjoining membrane cartridges which oppose to each other, at least one of such edge supporting members being made hollow to form a passage of permeated liquid.

This arrangement is advantageous in that because bubble of aeration gas spurted downward from the diffusing port rises without generating swirl even when a distance between the lower end of the membrane cartridges and the diffuser is short, such bubble is evenly supplied in the gaps between the membrane cartridges fast enough to prevent sludge from being adhered to the surface of the membrane. Since the membrane cartridges are made rigid as well as because predetermined gaps are defined between the respective filtration membranes of the adjoining membrane cartridges by a proper thickness of the edge supporting members of the membrane cartridges, even a simple structure can maintain a constant width of the gaps. Consequently, this arrangement can take full advantage of the cleaning effect of the gas-liquid cross flow, effectively preventing the cake formation on the membrane surface with a normal volume of the aeration gas.

EMBODIMENT

Figure 1:
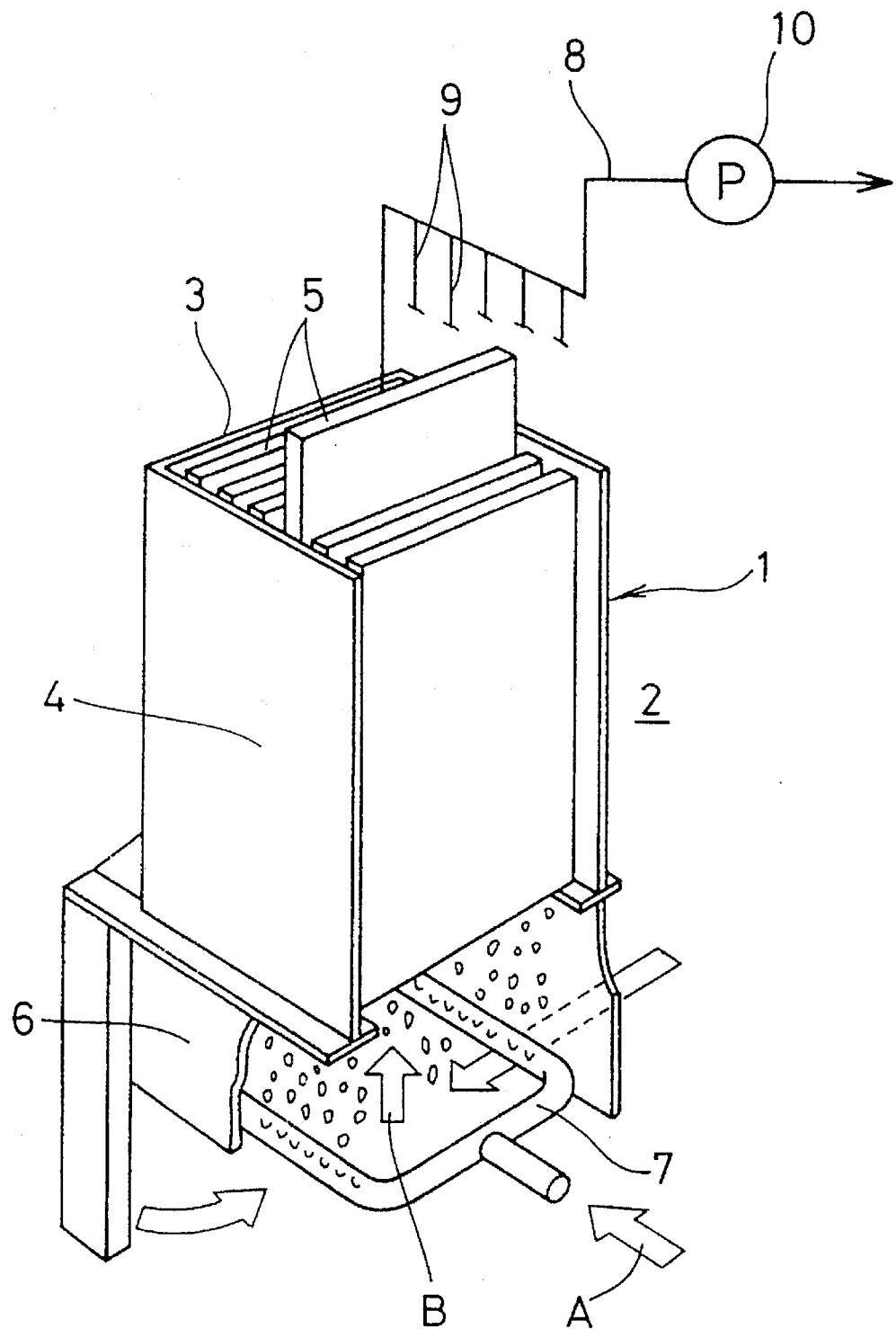
FIG. 1 is a perspective view illustrating the whole body of a conventional filtration membrane module.
Figure 2:
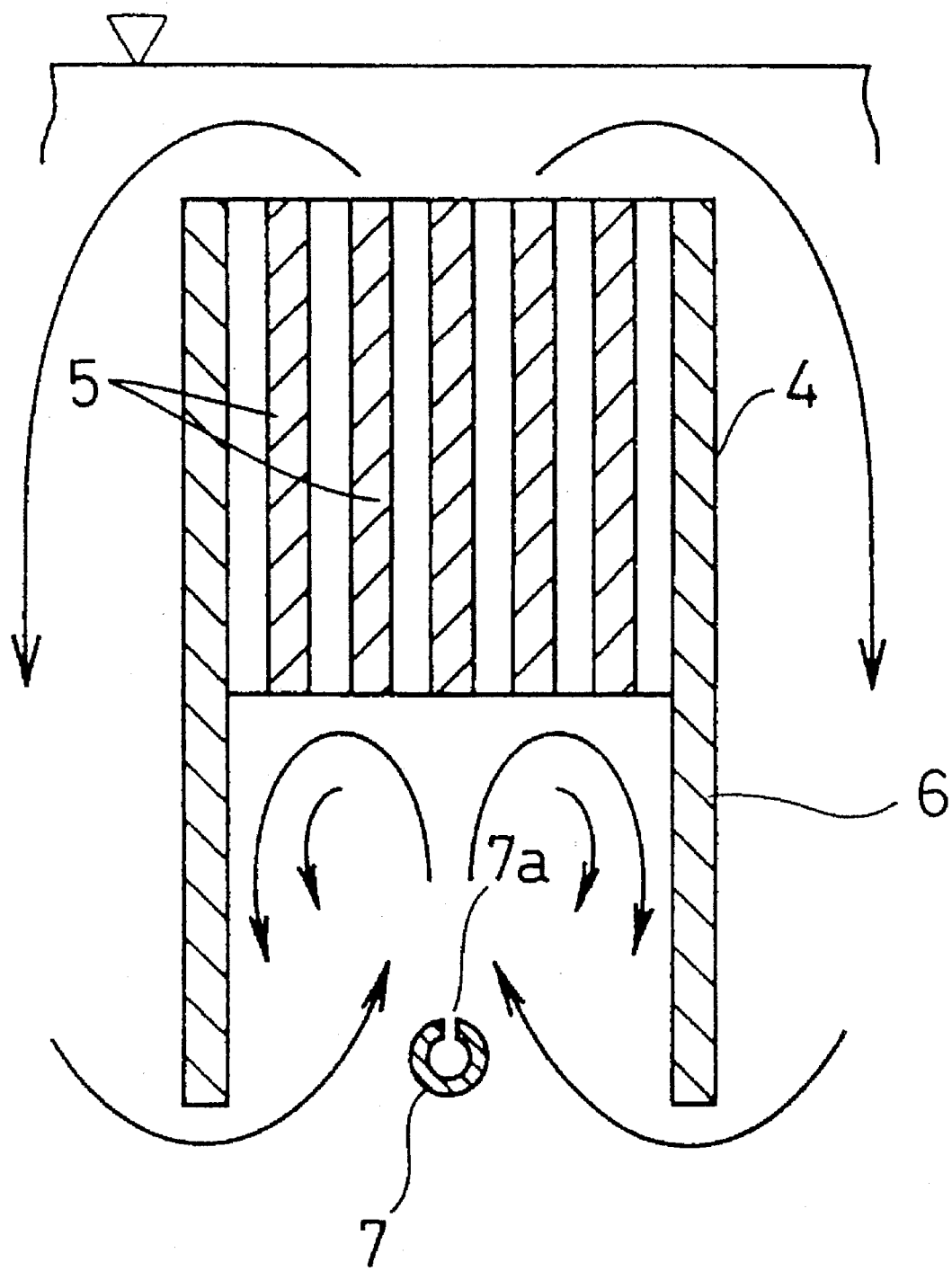
FIG. 2 is a schematic sectional view illustrating an essential part of aforesaid filtration membrane module.
Figure 3:
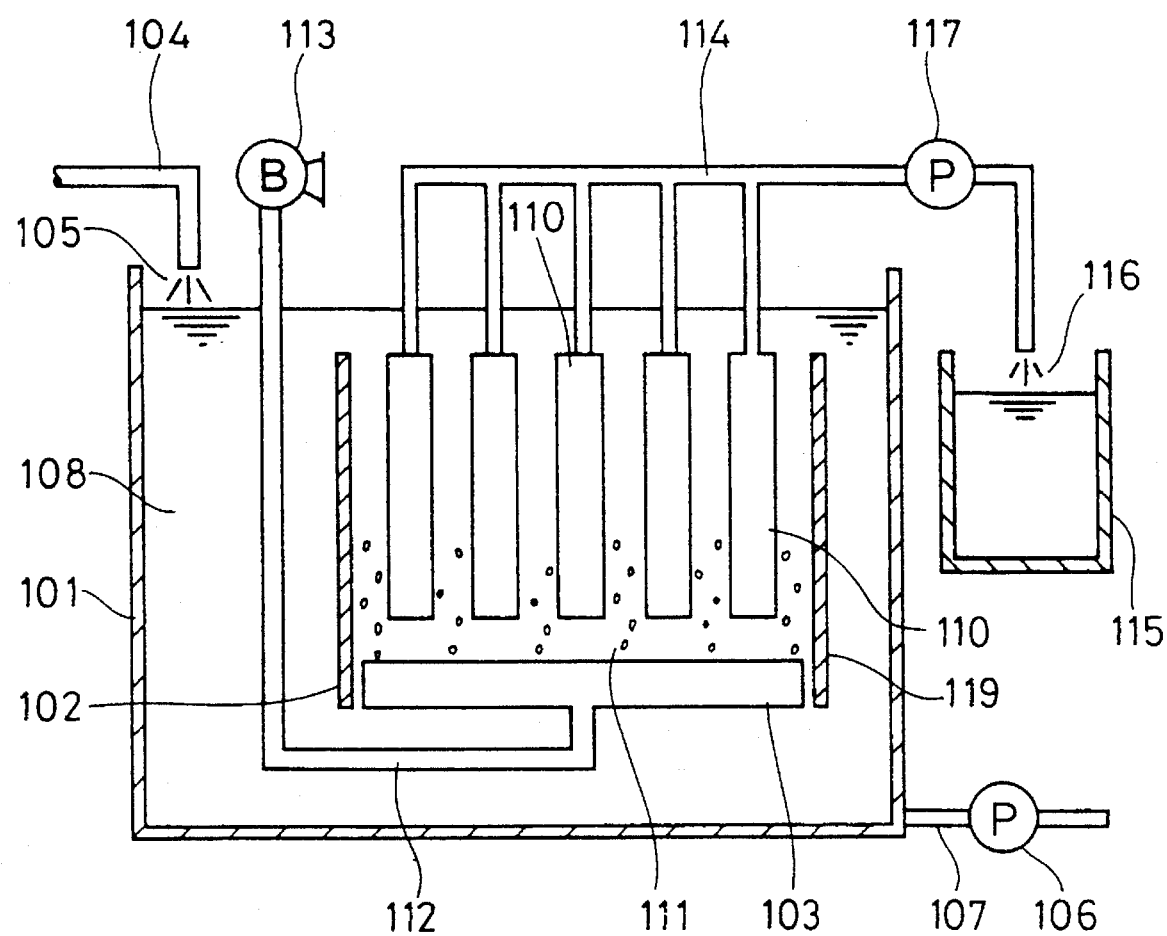
FIG. 3 is a view illustrating the whole construction of a filtration membrane module according to the present invention.

An embodiment of the present invention will be described with reference to the attached drawings. FIG. 3 shows the whole structure of a filtration membrane module embodying the present invention.

An aeration tank 101 has a filtration membrane module 102 submerged therein and is used for purification/treatment of a raw liquid 105 fed from a raw liquid feed pipe 104 while diffusing air and the like from a diffuser 103 disposed under the filtration membrane module 102. A sludge suction pipe 107 with a sludge pump 106 interposed thereon is connected to the bottom of the aeration tank 101 to drain excess sludge out of the tank.

The filtration membrane module 102 is used for solid-liquid separation of mixed liquid in the aeration tank produced from the activated sludge process of the raw liquid 105. The filtration membrane module 102 comprises a box frame 109 having the top and bottom ends thereof open, and plural membrane cartridges 110 accommodated in the box frame as vertically placed in parallel to each other at given space intervals.

The diffuser 103 is used for blowing an aeration gas 111 containing oxygen such as air into passages between the membrane cartridges 110, and is disposed under the membrane cartridges 110 being connected to a blower 113 via an air supply pipe 112. The passages of permeated liquid of the membrane cartridges 110 are communicated with a permeated liquid tank 115 via a suction pipe 114. A sucking pump 117 for sucking the permeated liquid 116 is interposed midway of the suction pipe 114.

Figure 4:
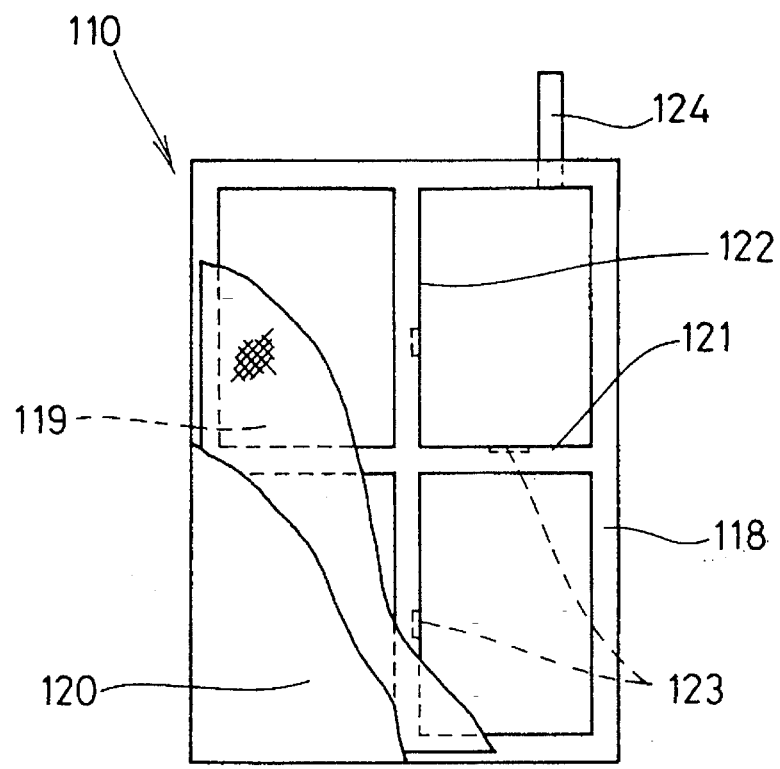
FIG. 4 is a partially cutaway elevation illustrating a membrane cartridge of aforementioned filtration membrane module.
Figure 5:
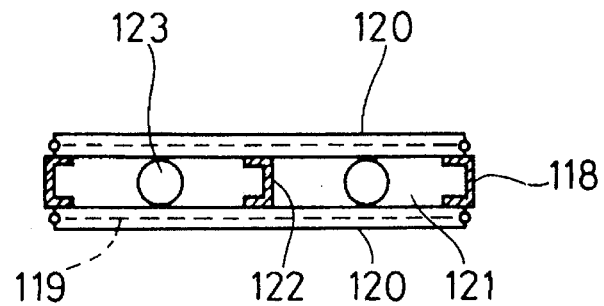
FIG. 5 is a sectional view illustrating aforesaid membrane cartridge.

As shown in FIGS. 4 and 5, the membrane cartridge comprises a membrane supporting plate 118, membrane supporting net 119 and organic filtration membrane 120. The membrane supporting plate 118 has a rectangular frame body made of groove-shaped stainless steel member, and a space in the frame body forms the passage of permeated liquid 116. Bars 121, 122 made of the same stainless steel with the above are provided lengthwise and widthwise inside of the frame body. The transverse bar 121 includes plural holes 123 penetrating therethrough lengthwise, while the lateral bar 122 includes plural holes 123 penetrating therethrough widthwise. The holes 123 also form the passage of permeated liquid 116. The membrane supporting net 119 between the membrane supporting plate 118 and filtration membrane 120 is welded to the frame-shaped membrane supporting plate 118. The membrane supporting net 119 supports the filtration membrane 120 and also defines a predetermined gap between the membrane supporting plate 118 and the filtration membrane 120.

The filtration membrane 120 covers both surfaces of the membrane supporting plate 118 having its periphery adhered to the membrane supporting plate 118 with an adhesive or welded by heat or ultrasonic wave to the membrane supporting net 119 using a fusion tape, so that a gap between the membrane supporting plate and filtration membrane is kept water sealed. The membrane supporting plate 118 comprises a suction nozzle 124, which introduces the permeated liquid 116 to the outside of the membrane cartridge 110 as communicated with the inside of the filtration membranes 120 and which is connected to said suction pipe 114.

In said arrangement, the raw liquid 105 fed to the aeration tank 101 from the raw liquid feed pipe 104 is subject to an activated sludge process as aerated with the aeration gas 111 which is sent by the blower 113 through the air supply pipe 112 and diffuser 103, and which is blown into the passages of the membrane cartridges 110. The membrane cartridges 110 separate the mixed liquid in the aeration tank 108 into solid matter and liquid through the filtration membrane 120, as the sucking pump 117 applies the sucking pressure through the suction pipe 114 to the inside of the frame-like membrane supporting plate 118. The purified permeated liquid through the filtration membrane 120 is supplied through the suction nozzle 124 and suction pipe 114 to the permeated liquid tank 115. The aeration gas 111 spurted from the diffuser 103 generates an upward flow due to an air lift effect. The upward flow composes a gas-liquid cross current, flowing through the passages between the adjoining membrane cartridges 110 to serve as a cleaning stream in parallel to the membrane surfaces of the filtration membranes 120, thereby restraining adhesion of the cake layer.

The membrane supporting plate 118 has a hollow structure, which forms the broad passage of permeated liquid with low flow resistance. The permeated liquid 116 through the filtration membrane 120 slowly flows through the passage of permeated liquid, allowing the sucking pressure from the sucking pump 117 to be evenly applied to the whole surface of the filtration membrane 120 of the membrane cartridges 110. Thus, the localization of the fouling is avoided on the filtration membrane 120.

Due to a rigid frame structure, the passages defined between the membrane cartridges 110 opposite to each other maintain a constant flow width at all times, so that the cleaning stream flows evenly over the whole surface of the membrane cartridges 110, producing the utmost cleaning effect.

The filtration membrane 120 urged by the sucking pressure toward the membrane supporting plate 118 is retained by the membrane supporting plate 118 through the membrane supporting net 119, which maintains a constant gap between the membrane supporting plate 118 and filtration membrane 120. The gap between the filtration membrane 120 and membrane supporting plate 118 forms a space across the filtration membrane 120 as communicated with the suction nozzle 124, allowing the sucking pressure to be applied to the whole surface of the filtration membrane 120. As a result, the localization of the fouling on the filtration membrane 120 is not only avoided but also permeate flux and the filtration length is increased. Furthermore, even the proliferation of microorganisms may not cause the closure of filtrate passages.

Figure 6:
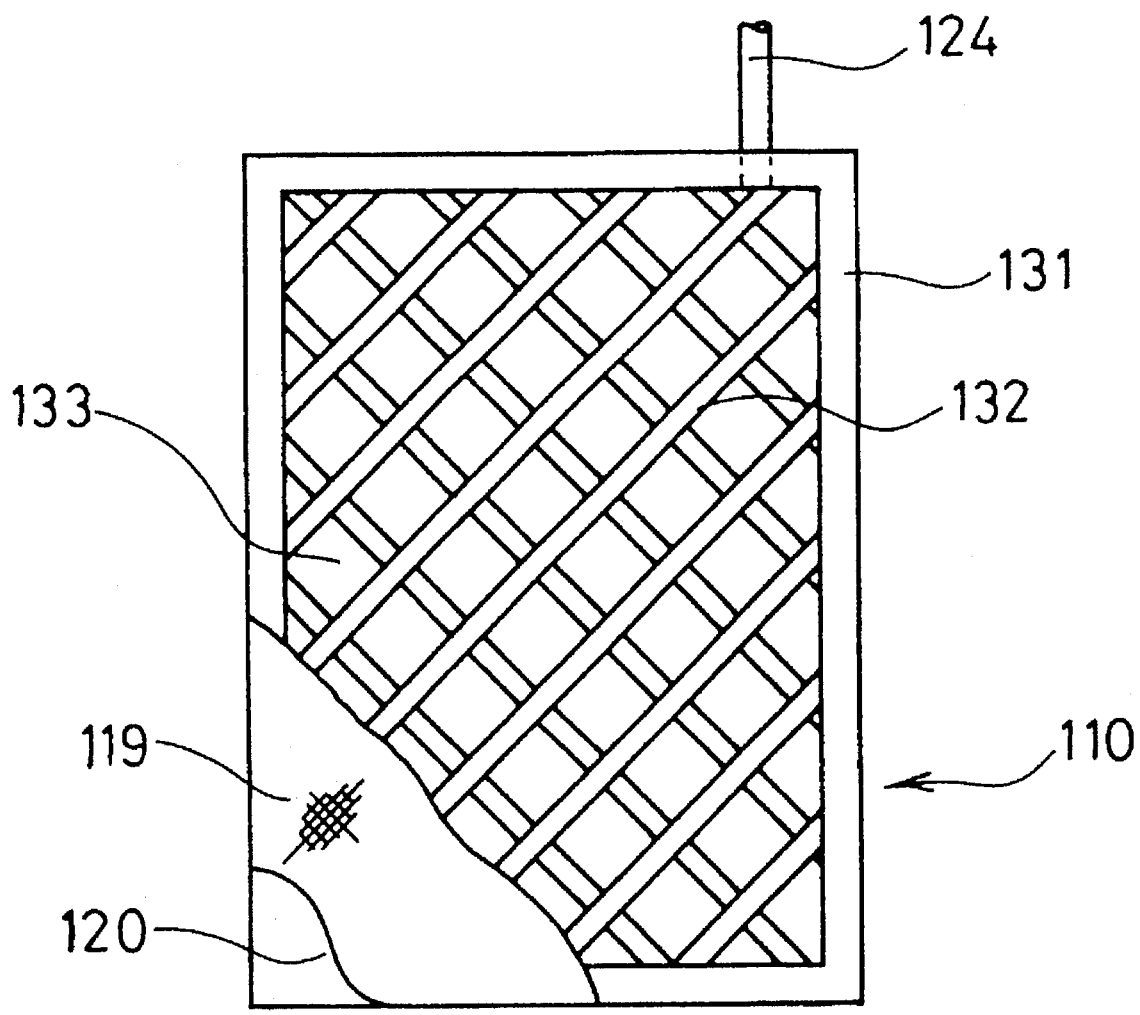
FIG. 6 is a partially cutaway elevation illustrating another embodiment of a membrane cartridge according to the present invention.

Instead of stainless steel, plastics may be used as materials for the frame body such as membrane supporting plate and membrane supporting net. FIG. 6 shows such an embodiment, in which elements having the same function as the previous embodiment are denoted by the same reference numerals.

In this embodiment, a membrane supporting plate 131 of the membrane cartridge 110 comprises crisscrossing bars 132, 133 integrally formed inside of the frame body. The bars 132 and 133 includes plural through-holes respectively (not shown in the figure) for forming the passage of the permeated liquid.

Figure 7:
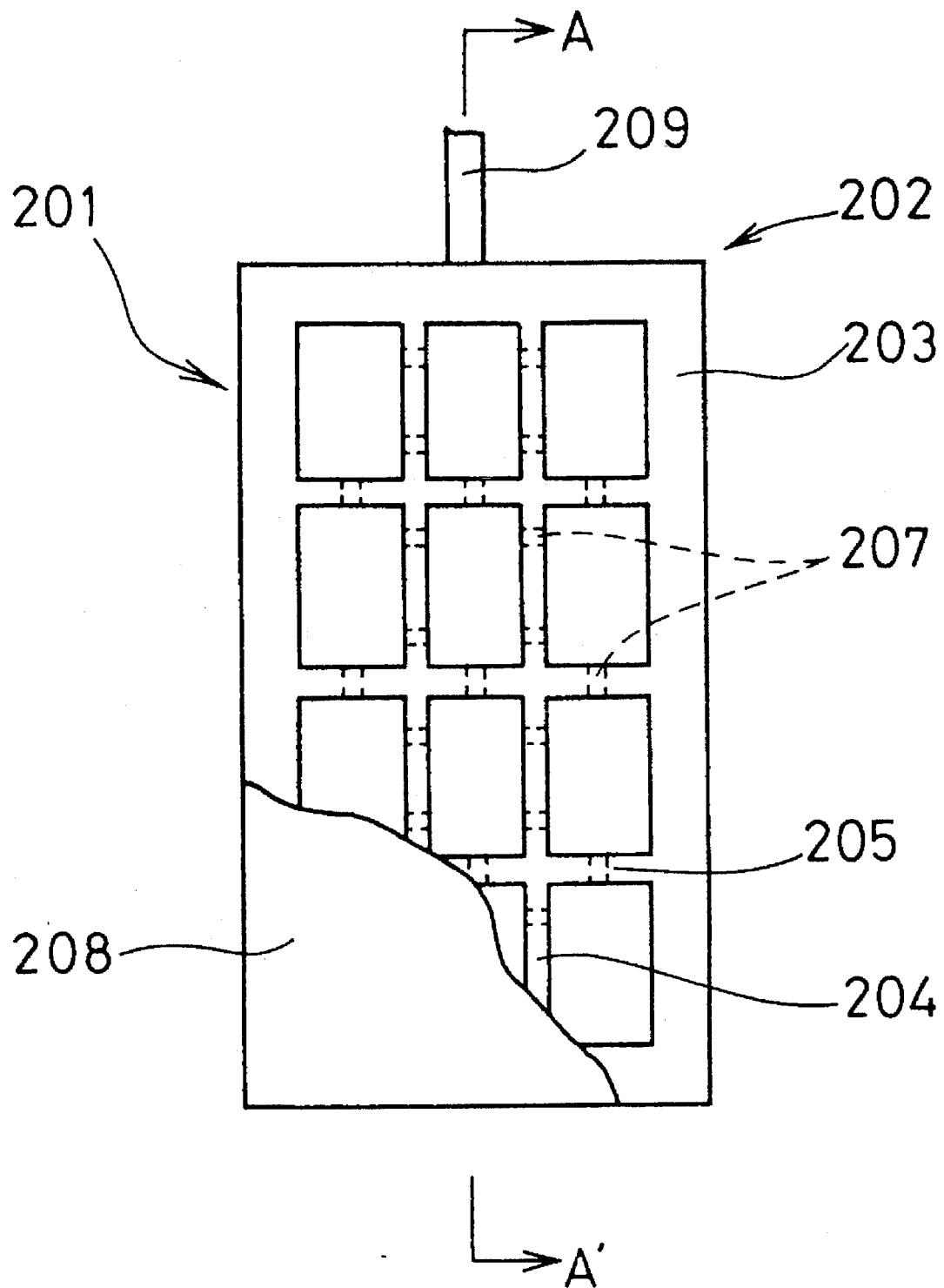
FIG. 7 is a partially cutaway elevation illustrating yet another embodiment of a membrane cartridge according to the present invention.
Figure 8:
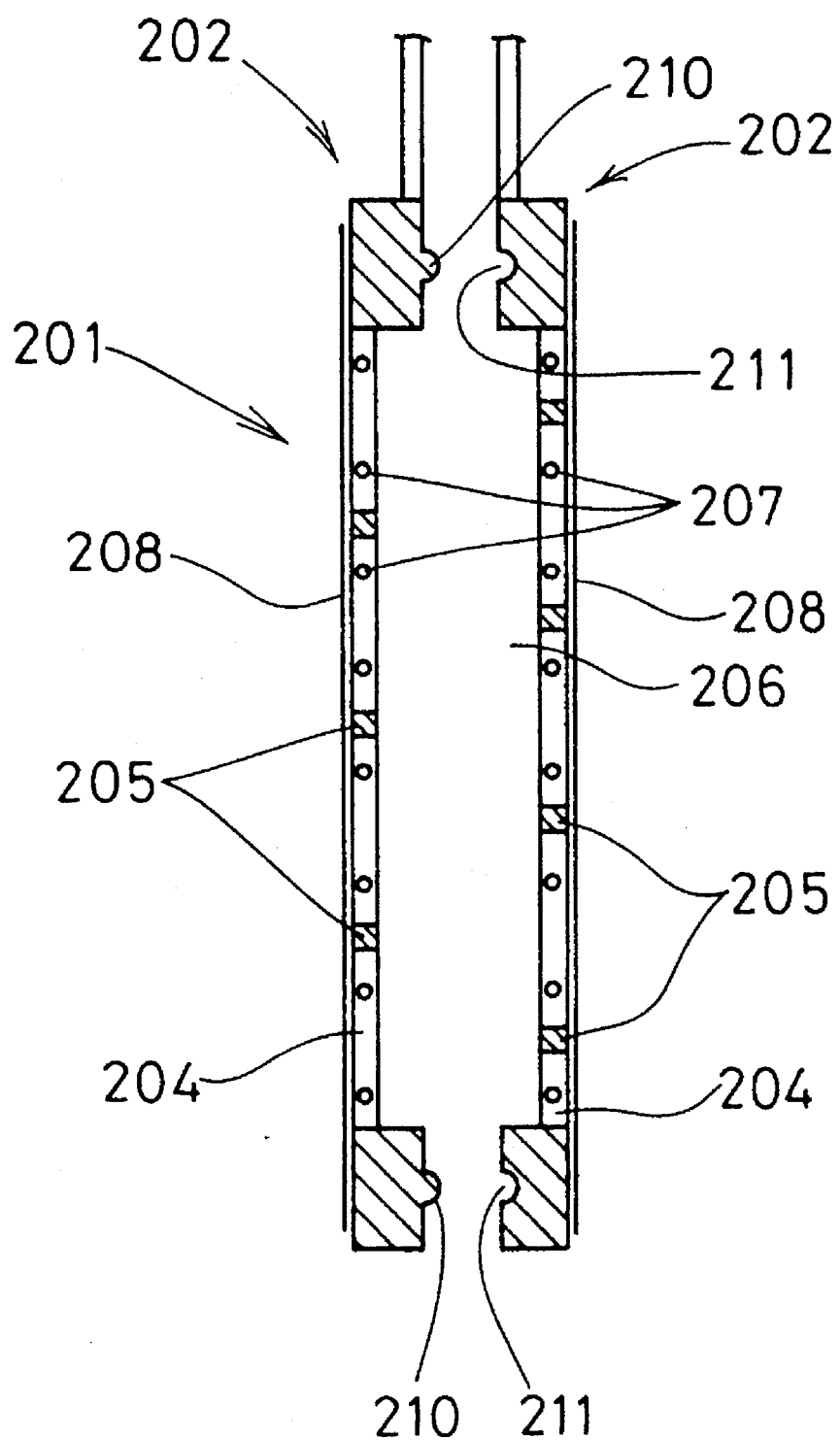
FIG. 8 is a transverse cross section illustrating aforesaid membrane cartridge.

FIGS. 7 and 8 shows another embodiment of the membrane cartridge in the filtration membrane module according to the present invention. According to FIGS. 7 and 8, a membrane cartridge 201 comprises a membrane supporting plate as a framing body which includes two separate frame bodies 202, 202 made of molded resin. Each of the frame bodies 202, 202 comprises a frame portion 203 having a width of 5 to 15 mm, and longitudinal bars 204 and transverse bars 205 criss-crossed inside of the frame portion 203 and integrally formed therewith.

The longitudinal bars 204 in a frame body 202 and those 204 in the other frame body 202, as well as the transverse bars 205 in a frame body 202 and those 205 in the other frame body 202 are offset each other so that they will not oppose each other when the two frame bodies 202 are coupled with each other, thereby preventing production of resistance to a passage 206 of permeated liquid formed between the frame bodies 202. Plural through-holes 207 are provided longitudinally in the transverse bars 205 and transversely in the longitudinal bars 204, composing a part of the passage 206 of permeated liquid. A preferable pitch of the longitudinal bars 204 and transverse bars 205 is from 10 to 50 mm, and a proper width of the longitudinal bars 204 and transverse bars 205 is from 2 to 6 mm. As for the passage, it is preferable to provide through-holes 207 having a diameter of 1 to 2 mm at a pitch of 50 to 100 mm.

The longitudinal bars 204 and transverse bars 205 are flush with the surface of the frame portion 203 at one side of the frame body 202, the surface on which a filtration membrane 208 is disposed. A counterpart of a cylindrical suction nozzle 209 for introducing the permeated liquid out of a membrane cartridge 201 is integrally formed with the frame portion 203.

On the surfaces of the frame bodies 202, 202 opposite to each other, protrusions 210 are provided on said opposite surface of one of said frame bodies 202, while recesses 211 are provided on said opposite surface of the other frame body 202. By fitting the protrusions 210 with the recesses 211, the two frame bodies 202 are unified by joining the frame portions 203 and the counterparts of the suction nozzle 209, thus composing a membrane supporting plate of the membrane cartridge 201.

To produce the membrane cartridge 201, a thermal plastic resin such as ABS resin and the like which is molten at high temperatures is poured into a mold, thereby forming aforesaid frame body 202 comprising the frame portion 203, counterpart of the suction nozzle 209, longitudinal bars 204 and transverse bars 205, as well as either the protrusions 210 or recesses 211. In this production process, the filtration membrane 208 is set on one surface of the frame body 202 and is fused with the resin in order to form the frame body 202 and filtration membrane 208 integrally.

Since this arrangement is adapted such that a pair of the frame bodies 202, 202 having the filtration membrane 208 thereon are fixed to each other by fitting the protrusions 210 with the recesses 211, the membrane cartridge 201 is readily disassembled or assembled, facilitating the cleaning of the filtration membrane in maintenance works. When the sucking pressure is applied, the permeated liquid can be drawn out through the passage of the through-holes while the filtration membrane 208 being supported by the transverse bars 204 and longitudinal bars 205. Accordingly, the flow resistance of the permeated liquid is reduced.

Figure 9:
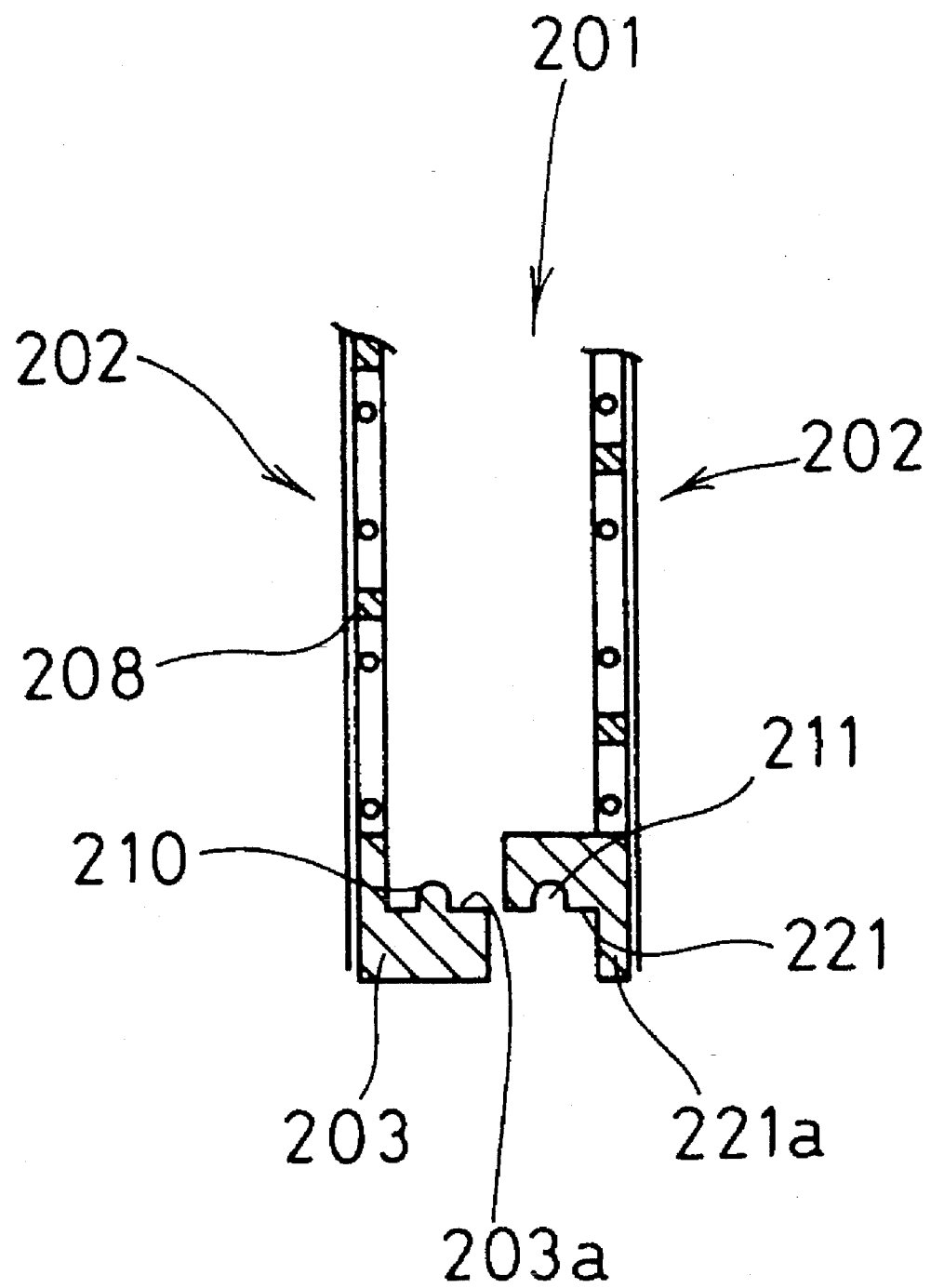
FIG. 9 is an enlarged sectional view illustrating an essential part of aforesaid membrane cartridge.
Figure 10:
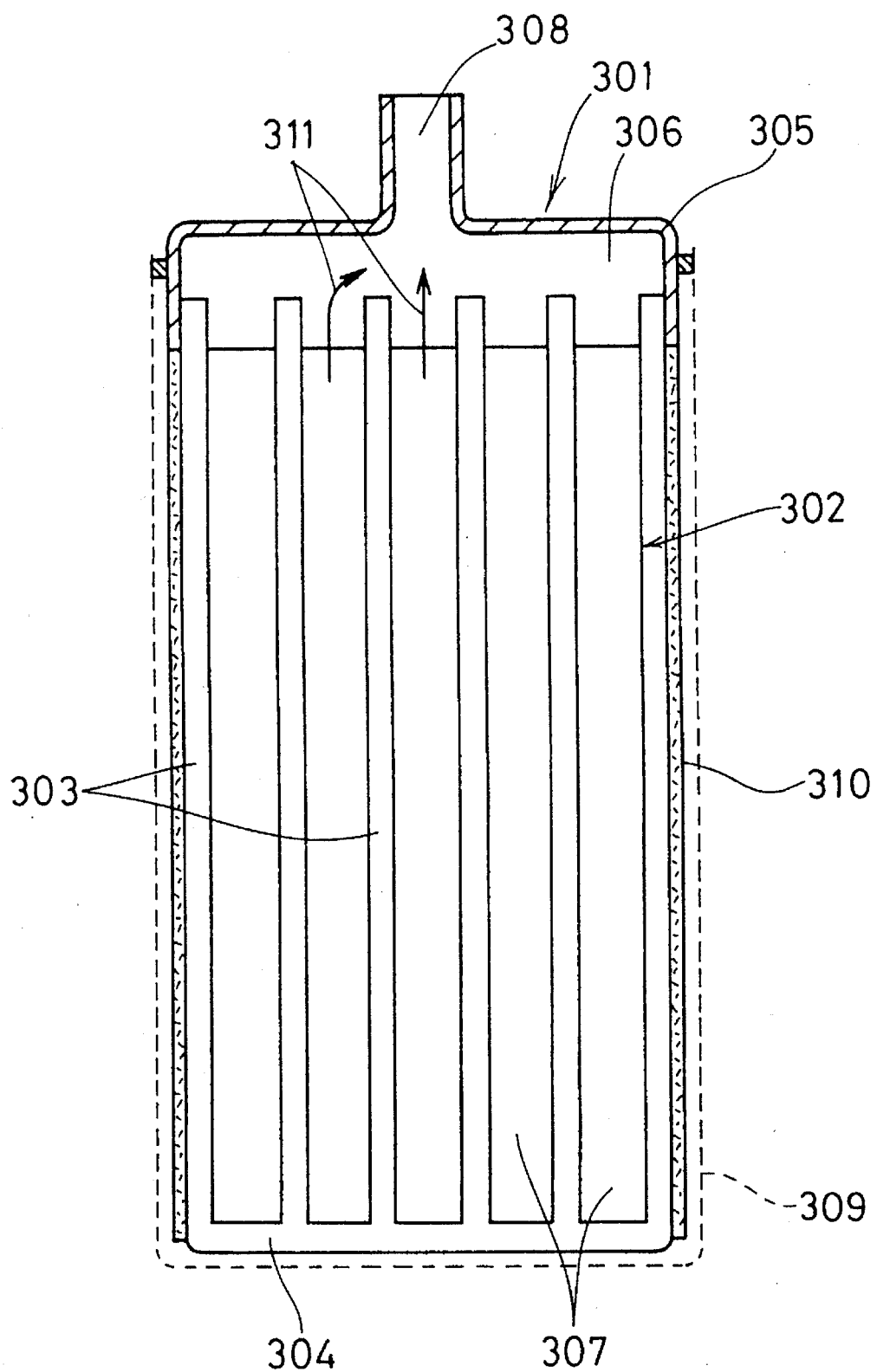
FIG. 10 is a partially cutaway elevation illustrating still another embodiment of a membrane cartridge according to the present invention.
Figure 11:
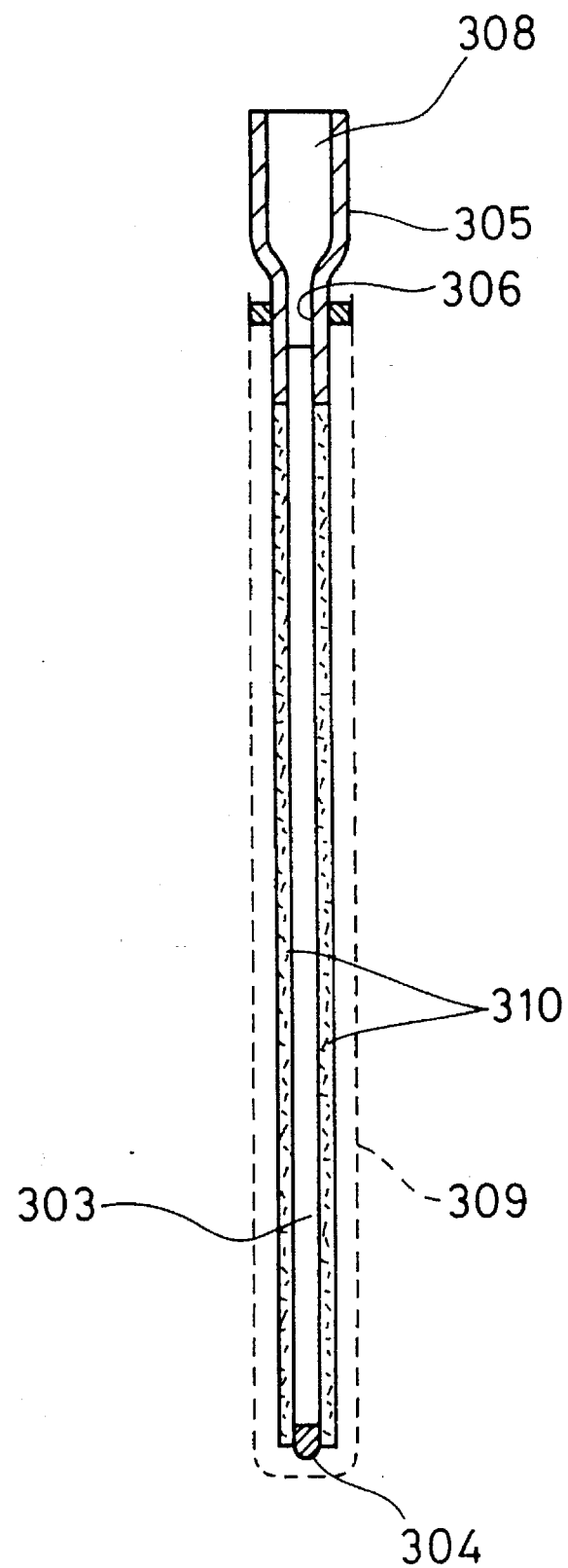
FIG. 11 is a vertical section illustrating aforesaid membrane cartridge.
Figure 12:
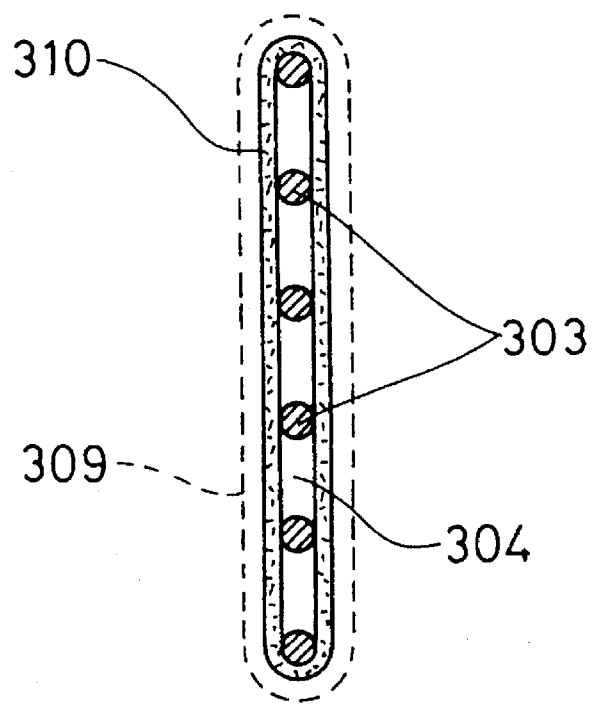
FIG. 12 is a transverse section illustrating aforesaid membrane cartridge.
Figure 13:
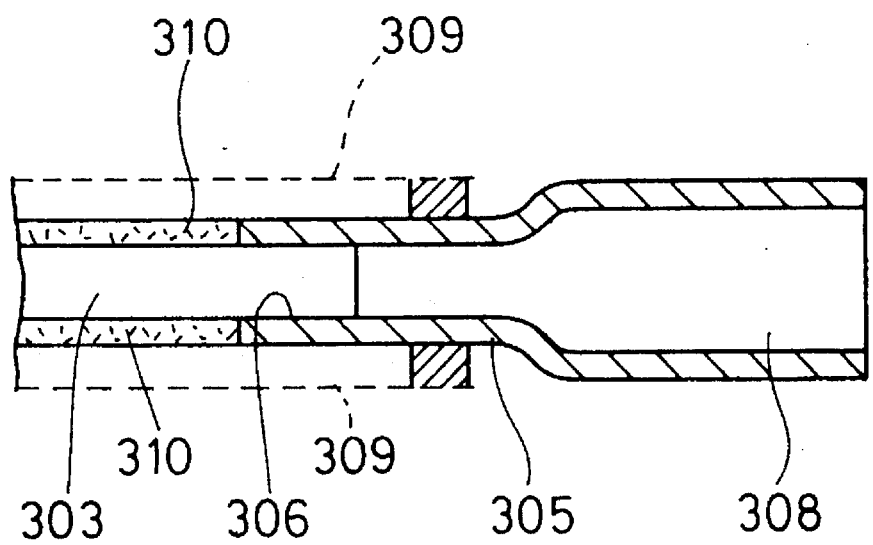
FIG. 13 is an enlarged sectional view illustrating an essential part of aforesaid membrane cartridge.

FIG. 9 shows another example of a structure for joining the frame bodies 202, 202. In FIG. 9, the frame body 202 has a frame portion 221 whose opposing surface has an L-shape in section. The L-shaped part of the frame portion 221 is fit with the inner side of the frame portion 203 of the other frame body 202, and the protrusion 210 and recess 211 on the respective overlapping surfaces 221a, 203a are fit each other. Attaching rubber packing between the frame bodies 202, 202 will augment a sealing effect.

FIGS. 10 through 13 show another embodiment of the membrane cartridge in the filtration membrane module according to the present invention. According to FIGS. 10 to 13, a membrane supporting plate 302 of a membrane cartridge 301 comprises plural membrane supporting frame members 303 arranged in parallel to each other, and a coupling frame member 304 for coupling with an end of each of the membrane supporting frame members 303 as disposed in the direction to intersect with these membrane supporting frame members 303. The membrane supporting frame members 303 and coupling frame member 304 are made of a rigid member such as plastics or stainless steel, and have a sectional form including circle, ellipse and square.

The other ends of the membrane supporting frame members 303 are inserted in an opening 306 of a liquid collecting cap 305, and the membrane supporting frame members 303 and liquid collecting cap 305 are fixed to each other by means of fusion or adhesion. Thus, passage 307 of permeated liquid to the liquid collecting cap 305 are formed between the membrane supporting frame members 303, 303. The liquid collecting cap 305 has a suction nozzle 308 communicated with a suction pipe 114. The filtration membrane 309, which is either microfiltration membrane or ultrafiltration membrane, is shaped like a bag, covering the both surfaces of the membrane supporting plate 302. It is fixed to the periphery of the liquid collecting cap 305 by means of adhesion or fusion for water sealing. Between the membrane supporting plate 302 and filtration membrane 309, a porous member 310 encloses the membrane supporting frame members 303 of the membrane supporting plate 302 to protect the filtration membrane 309. The porous member 310 is made of a material such as felt, unwoven fabric or wool cloth which has fine communication apertures in the three-dimensional directions.

In this arrangement, by applying the sucking pressure through the liquid collecting cap 305 to the passage of permeated liquid 307 between the membrane supporting frame members 303, 303, the filtration process is performed through the filtration membrane 309. After flowing through the passage of permeated liquid 307 between the membrane supporting frame members 303, 303, the permeated liquid 311 is introduced into the suction pipe 114 through this broad passage in section, flowing without much flow resistance and so improving the filtration efficiency.

Since the porous member 310 keeps the filtration membrane 309 a given distance away from the membrane supporting plate 302 at all times, the sucking pressure is readily applied to the whole surface of the filtration membrane 309. This prevents the localization of the fouling on the membrane, further improving the filtration efficiency.

The membrane supporting plate 302 is composed of the membrane supporting frame members 303 having rigidity, which is effective to avoid the uneven passage width between the membrane cartridges 301, thereby evenly distributing the cleaning stream to the whole surfaces of the membranes. This will restrain the local accumulation of deposit on the membrane surface, and therefore assure a long filtration length and high permeate flux. The membrane supporting frame members 303 and liquid collecting cap 305 may be formed integrally.

Figure 14:
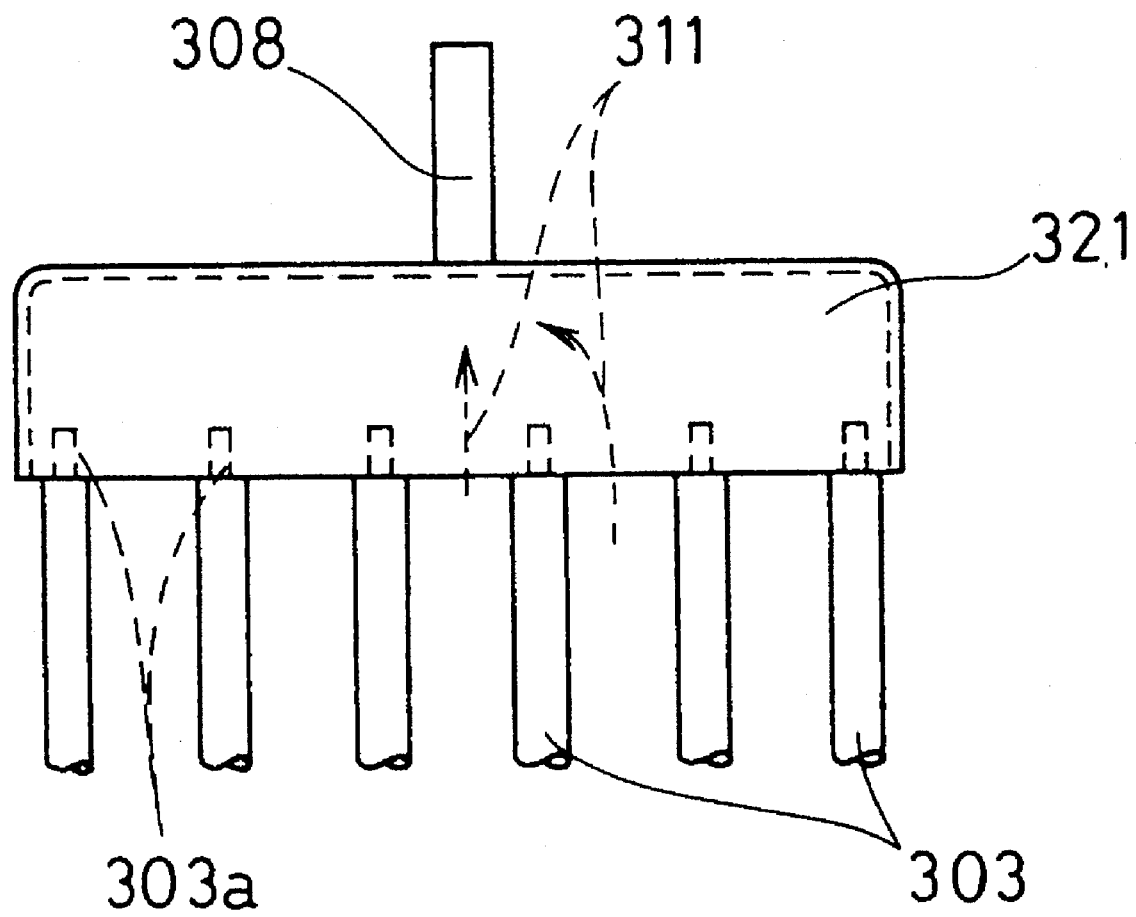
FIG. 14 is an enlarged view illustrating an essential part of another membrane cartridge.
Figure 15:
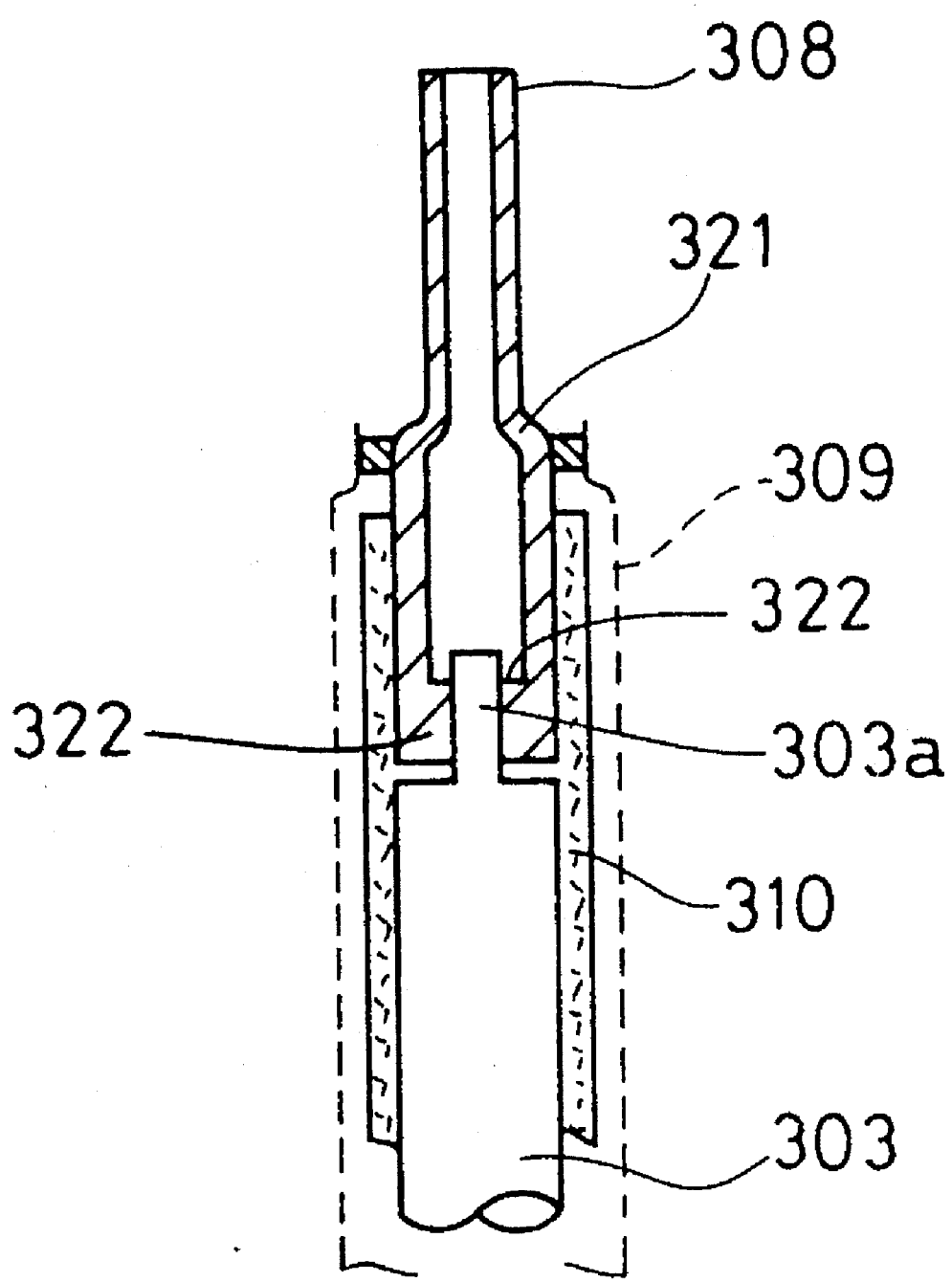
FIG. 15 is an enlarged sectional view illustrating an essential part of aforesaid membrane cartridge.

The liquid collecting cap 305 and membrane supporting plate 302 may also be joined in a manner shown in FIGS. 14 and 15. According to FIGS. 14 and 15, a liquid collecting cap 321 comprises an elastic step portion 322 along the inner peripheral side of the opening thereof. The step portions 322, 322 on both inner peripheral sides of the opening detachably hold plural membrane supporting frame members 303. The end portion 303a of the membrane supporting frame member 303 has a smaller diameter than the rest such that it may be inserted between the step portions 322, 322.

This arrangement not only provides the same action as the previous embodiments, but also features a merit that because the membrane supporting frame members 303 of the membrane supporting plate 302 are removably attached to the liquid collecting cap 309, the membrane supporting plate 302 is readily put to reuse after the disposal of the liquid collecting cap 321 when the life of the filtration membrane 309 is expired.

Figure 16:
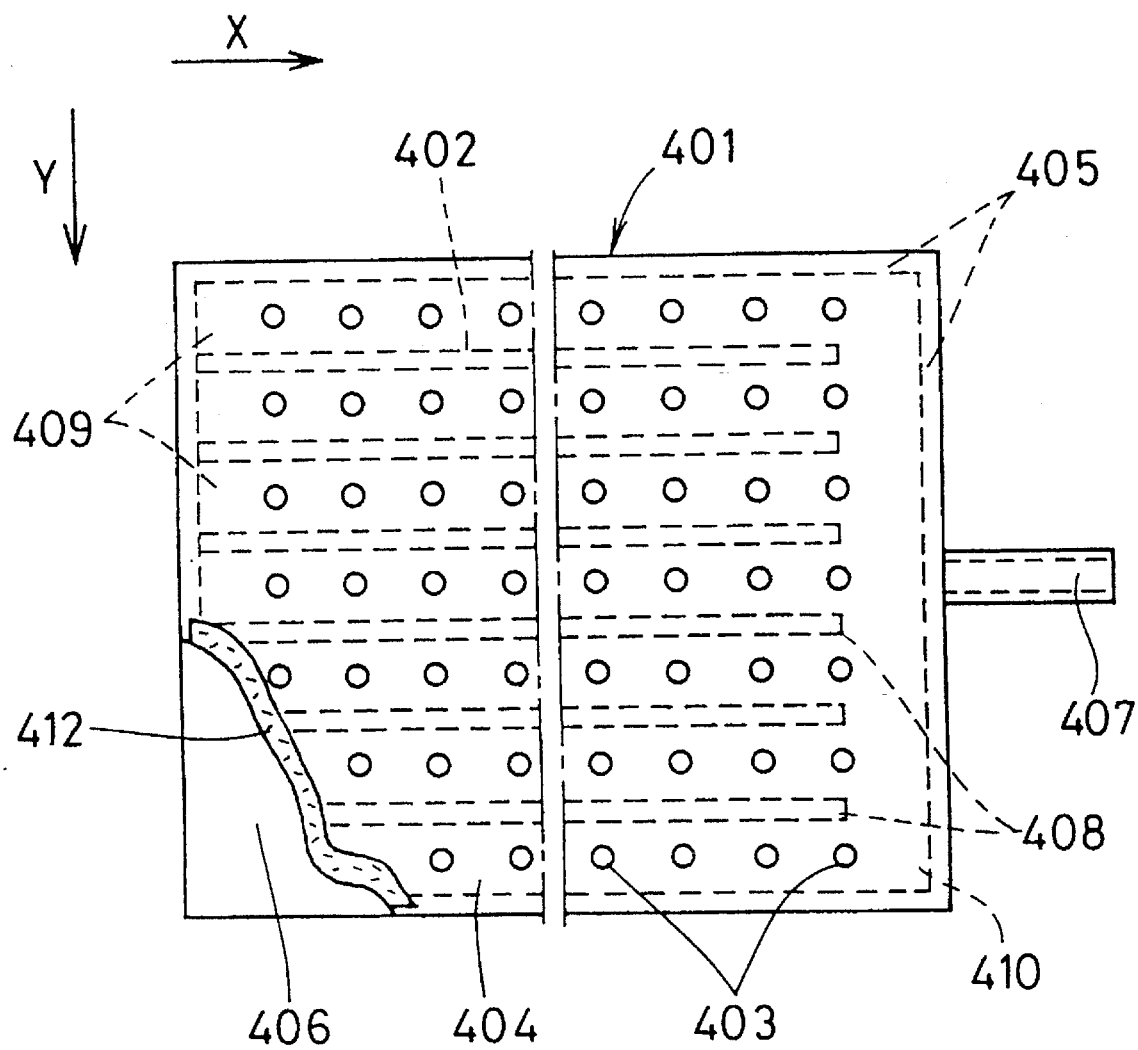
FIG. 16 is a partially cutaway elevation illustrating yet another embodiment of a membrane cartridge according to the present invention.
Figure 17:
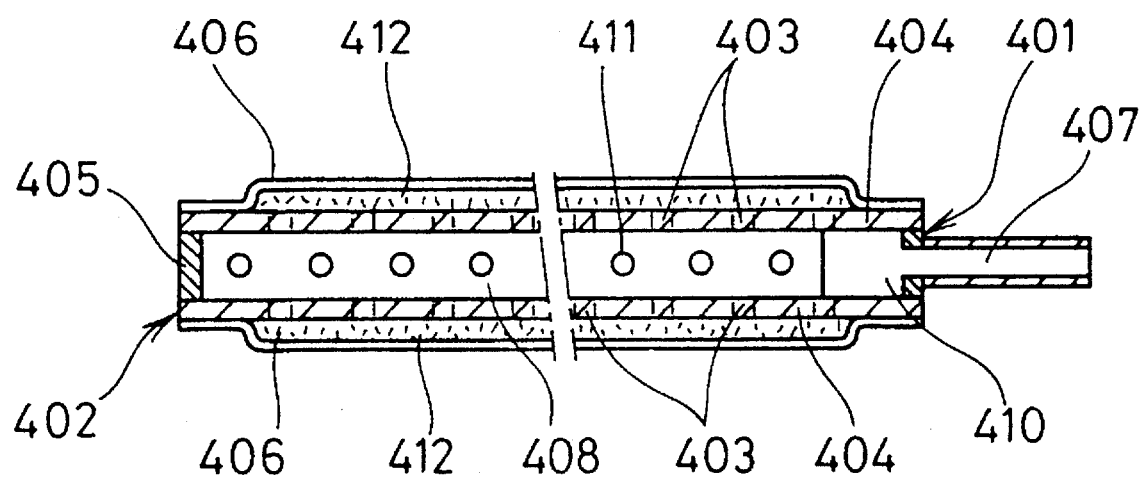
FIG. 17 is a transverse section illustrating aforesaid membrane cartridge.
Figure 18:
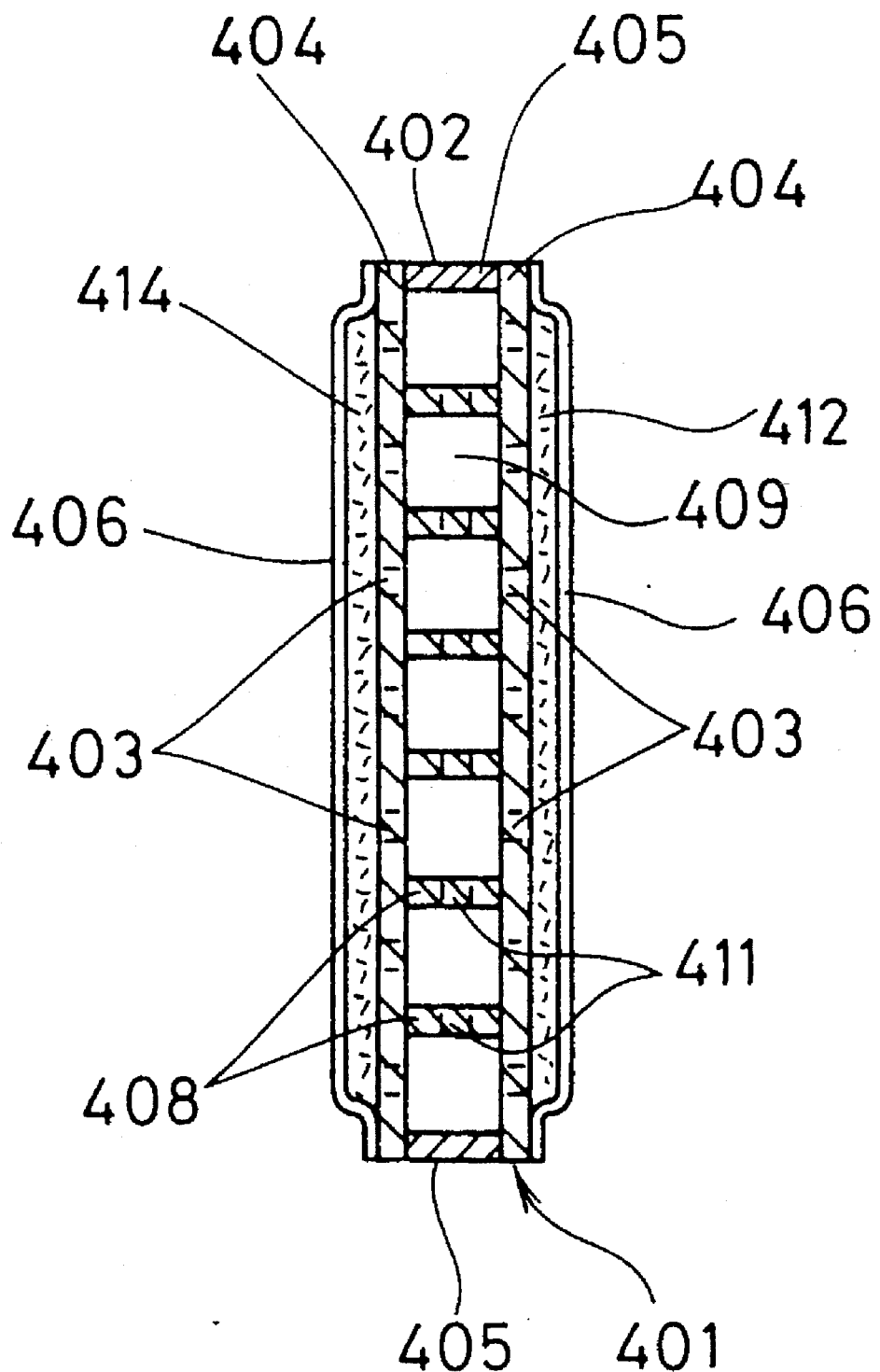
FIG. 18 is a vertical section illustrating aforesaid membrane cartridge.

FIGS. 16 to 18 show another embodiment of the membrane cartridge in the filtration membrane module according to the present invention. In FIGS. 16 to 18, a membrane supporting plate 402 of a membrane cartridge 401 is made hollow, and comprises a pair of flat plates 404, 404 having small apertures 1 to 3 mm in diameter and a plate-like coupling support member 405 for joining the peripheries of said flat plates to close the same completely. The membrane supporting plate 402 comprises a filtration membrane 406 covering the both surfaces thereof and a suction nozzle 407 for drawing out permeated liquid as communicated with the hollow part of the membrane supporting plate 402.

The membrane supporting plate 402 includes therein plural rib members 408 disposed in parallel to each other, which retain the flat plates 404, 404 at given space intervals and form passage 409 of permeated liquid therebetween 408, 408. At the suction nozzle 407 side, the rib members 408 are spaced some distance from the coupling support member 405 to define a liquid collecting portion 410 at the suction nozzle side.

Said small apertures 403 ape provided along the passage 409 of permeated liquid between the rib members 408. The rib members 408 may also include small apertures 411 fop the permeated liquid to flow into the adjoining passage 409 of permeated liquid.

The filtration membrane 406 for microfiltration or ultrafiltration has its periphery fixed to the membrane supporting plate 402 by means of adhesion or fusion. A spacer 412 is interposed between the membrane supporting plate 402 and filtration membrane 406, keeping the membrane supporting plate 402 some distance away from the filtration membrane 406. The spacer 412 is made of a material such as felt, unwoven fabric or wool cloth which has fine communication apertures in the three-dimensional directions.

In this arrangement, after entering the membrane supporting plate 402 through the spacer 412 and small apertures 403 in the flat plate 404, the permeated liquid is introduced through the passage 409 of permeated liquid to the liquid collecting portion 410, to be discharged out of the membrane cartridge 401 through the suction nozzle 407. Since the passage 409 of permeated liquid in the membrane supporting plate 402 has a large sectional area and besides, the small apertures 411 provide passages communicating the adjoining passages 409 of permeated liquid, the flow resistance in the passages 409 of permeated liquid is kept low and the sucking pressure may be evenly applied to the whole surface of the filtration membrane 406.

The hollow membrane supporting plate 402 is supported by the rib members 408 from inside, and thus deformation in the directions of X- and Y-axes is prevented. Accordingly, the width of the passage between the membrane cartridges 401 is kept constant so that the cleaning effect is equally distributed on the whole surface of the filtration membrane 406. The spacer 412 forms passages introducing permeated liquid in the small apertures 403.

Figure 19:
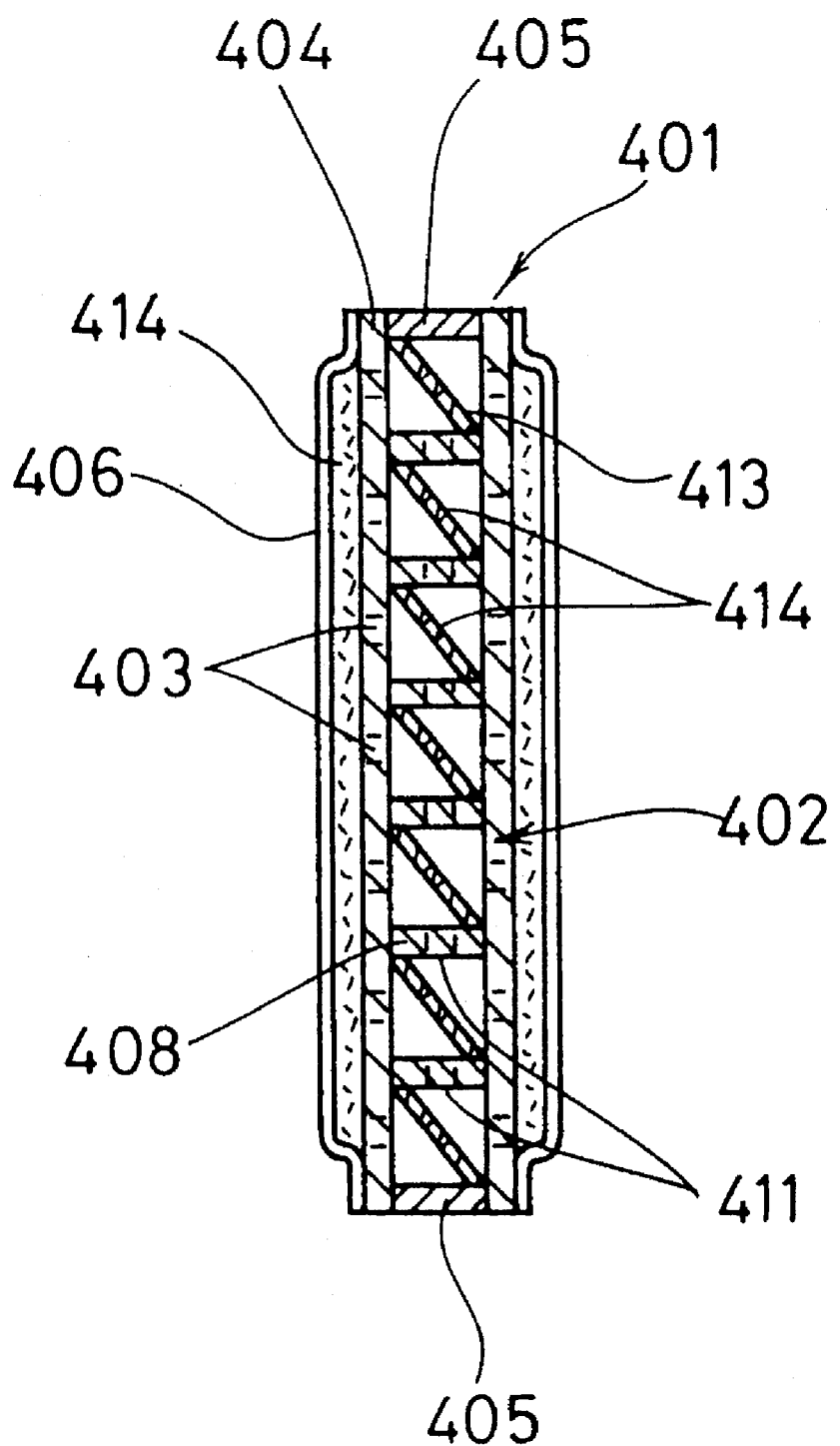
FIG. 19 is a vertical section illustrating another membrane cartridge.

As shown in FIG. 19, the membrane cartridge 401 may also comprise slant rib members 413 between the rib members 408, 408. The slant rib member 413 connects the upper end of a rib member 408 to the lower end of the adjoining rib member 408. The slant rib members 413 also include small apertures 414 for the permeated liquid to pass through. The arrangement of this embodiment produces the same action as the previous embodiments, and also further increases the rigidity of the membrane cartridge 401.

Figure 20:
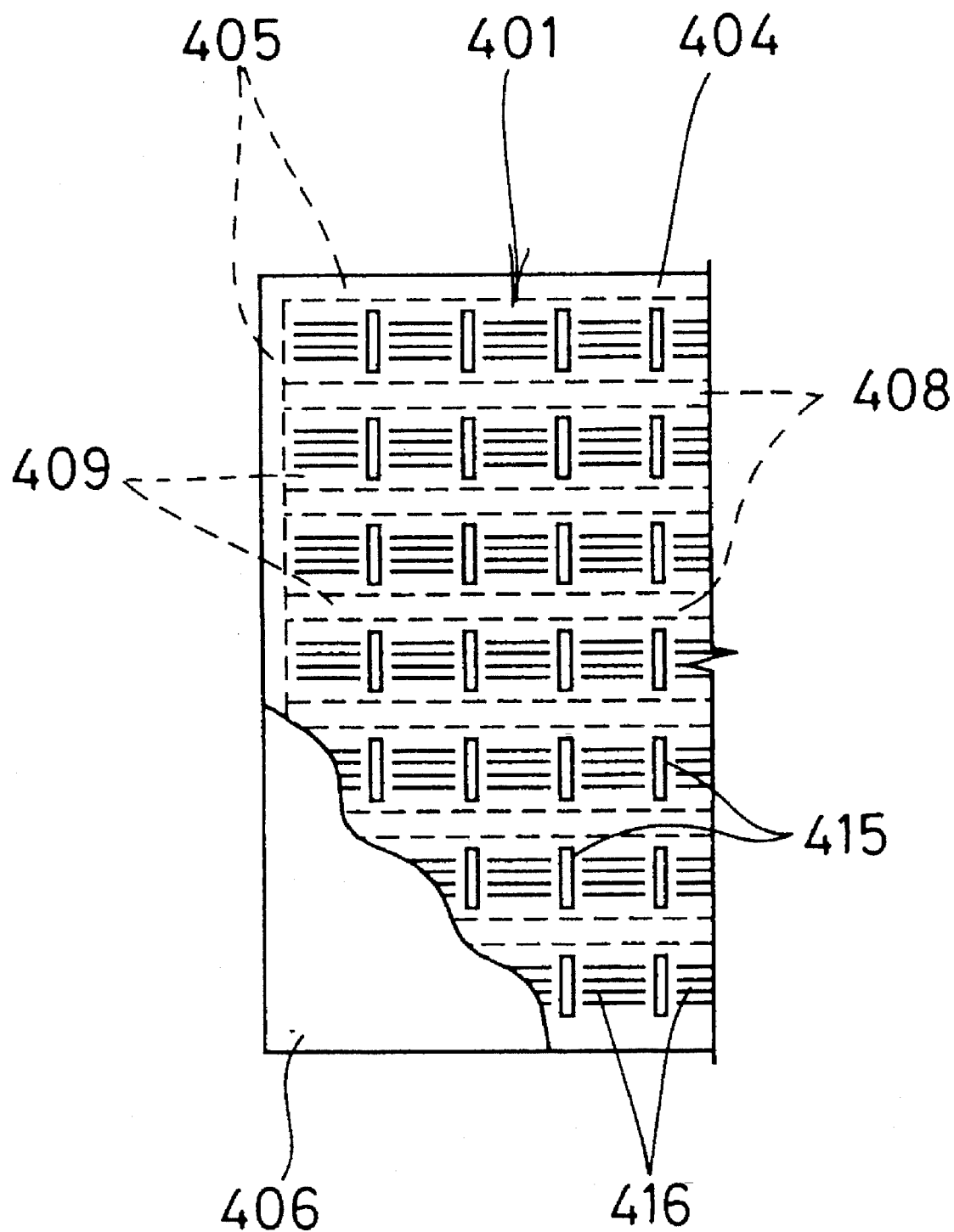
FIG. 20 is an enlarged view illustrating an essential part of another membrane cartridge.

As shown in FIG. 20, the flat plate 404 of the membrane cartridge 401 may also comprise thin slits 415 widthwise of the passage 409 of permeated liquid, and thin grooves 416 communicated to the thin slits 415 may be laid over the surface of the flat plate 404. The arrangement of this embodiment produces the same action as the previous embodiments, and also facilitates the flow of permeated liquid into the membrane supporting plate 402 because the thin grooves 416 smoothly introduce the permeated liquid on the surface of the flat plate 404 to the thin slits 415.

Figure 21:
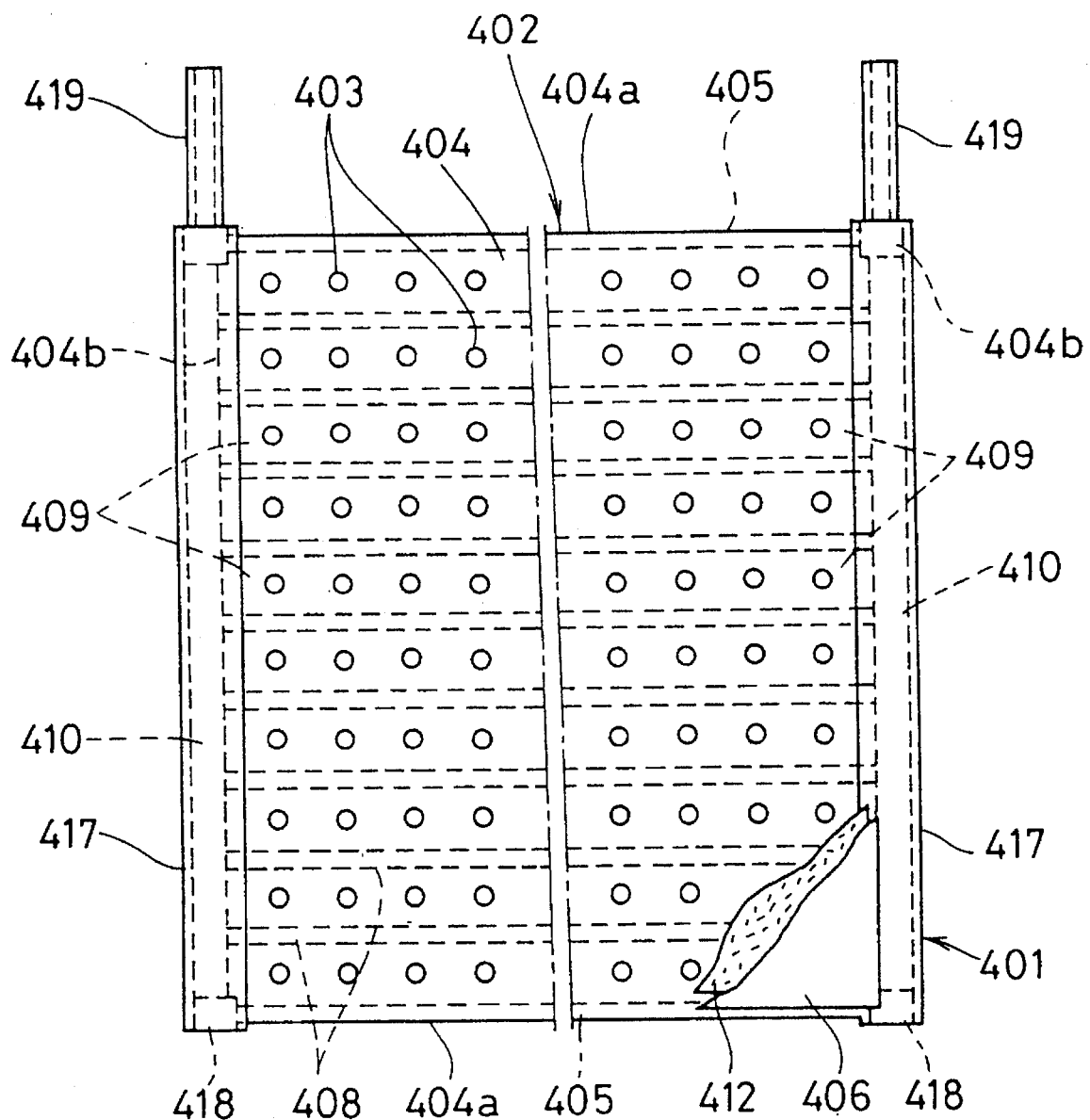
FIG. 21 is a partially cutaway elevation illustrating yet another embodiment of a membrane cartridge according to the present invention.
Figure 22:
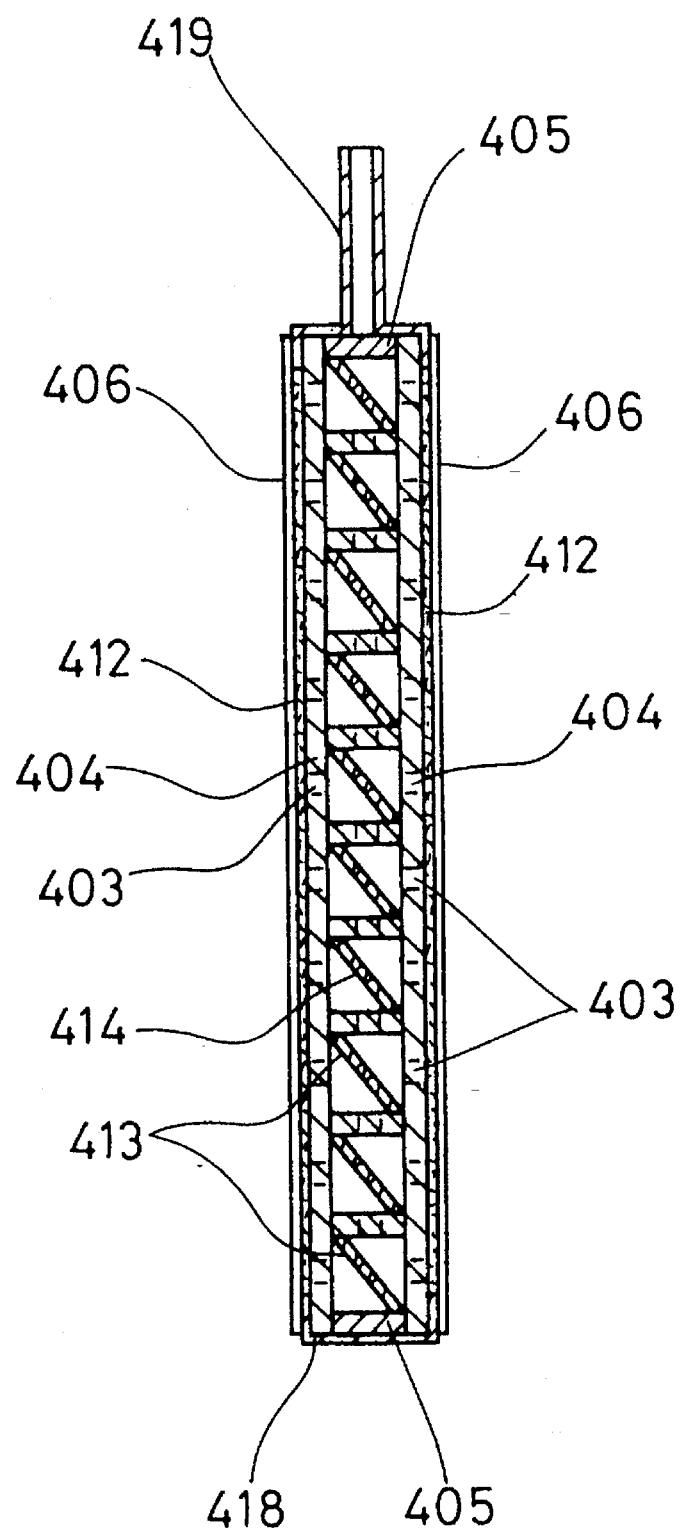
FIG. 22 is a vertical section illustrating aforesaid membrane cartridge.
Figure 23:
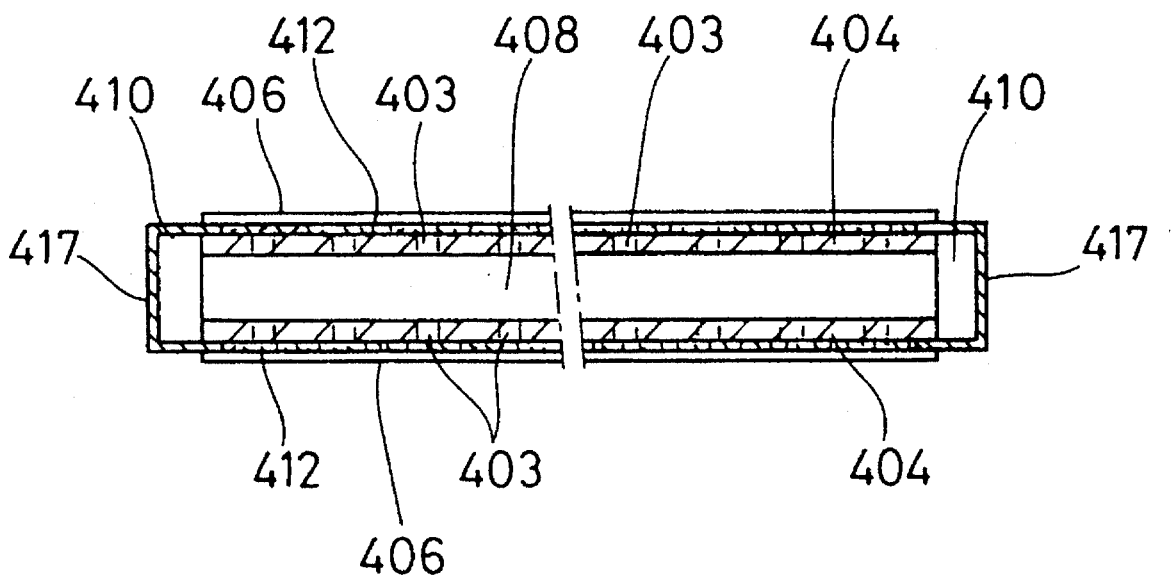
FIG. 23 is a transverse section illustrating aforesaid membrane cartridge.
Figure 24:
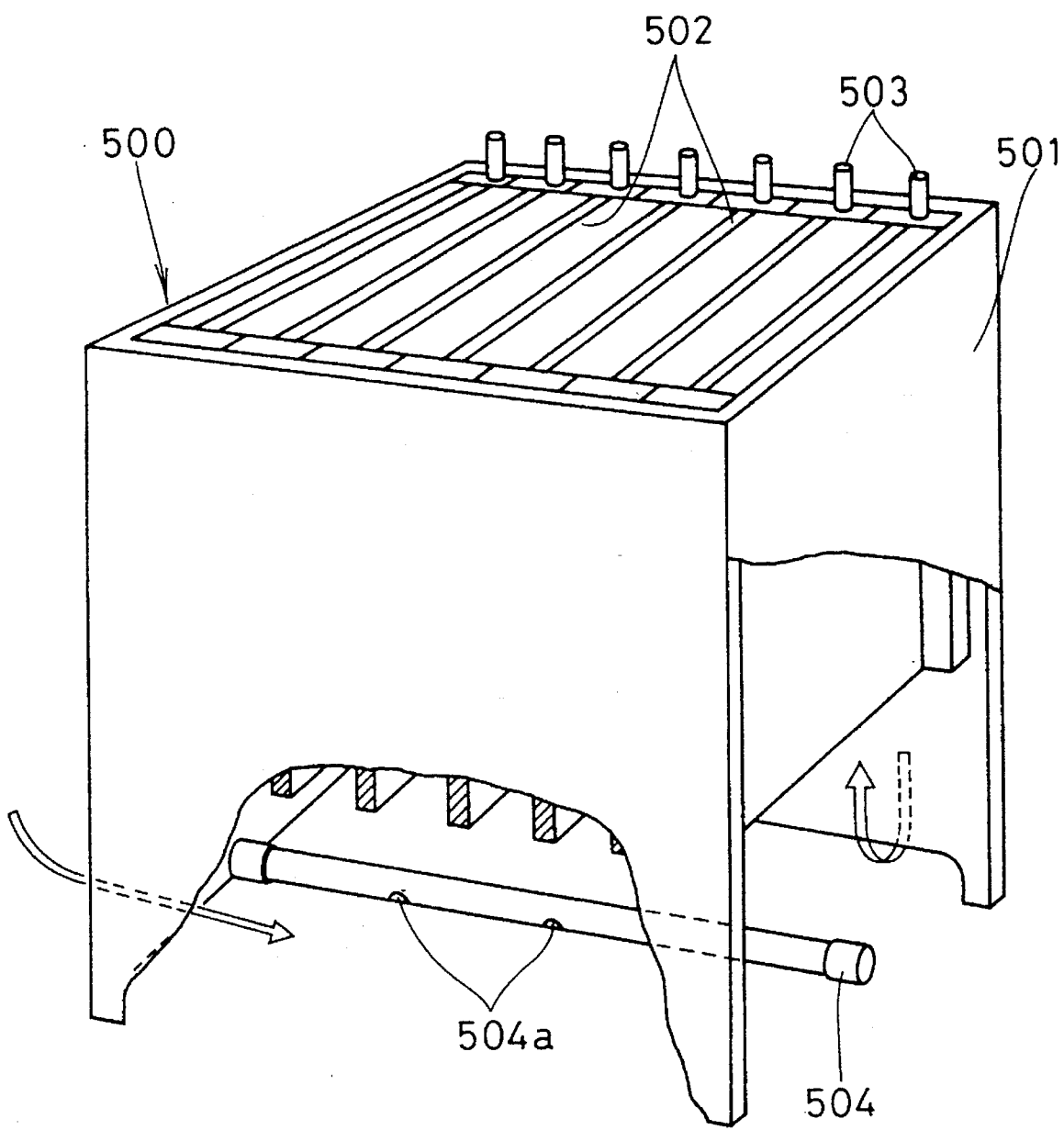
FIG. 24 is a perspective view illustrating the whole body of still another embodiment of a filtration membrane module according to the present invention.
Figure 25:
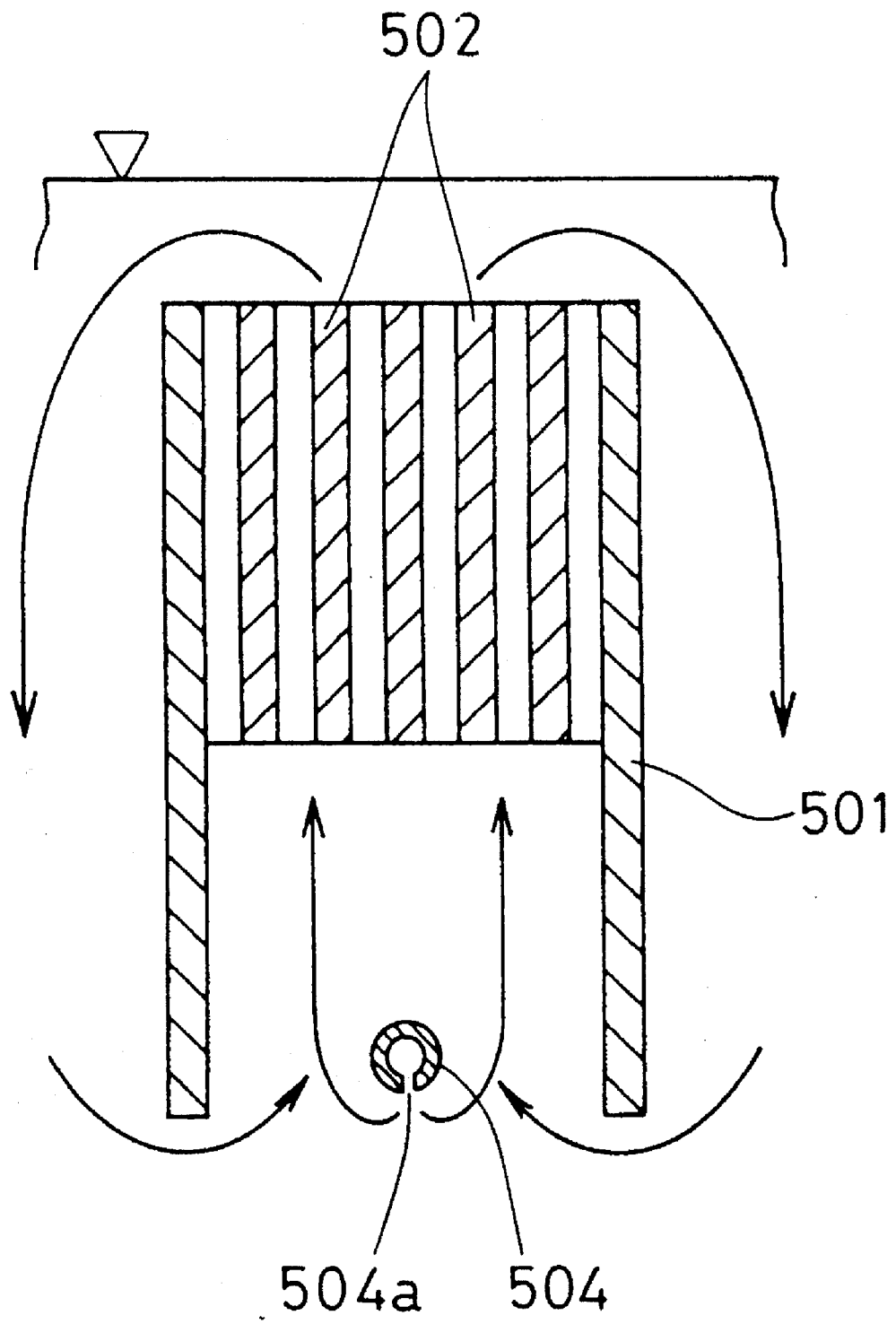
FIG. 25 is a schematic sectional view illustrating an essential part of aforesaid filtration membrane module.
Figure 26:
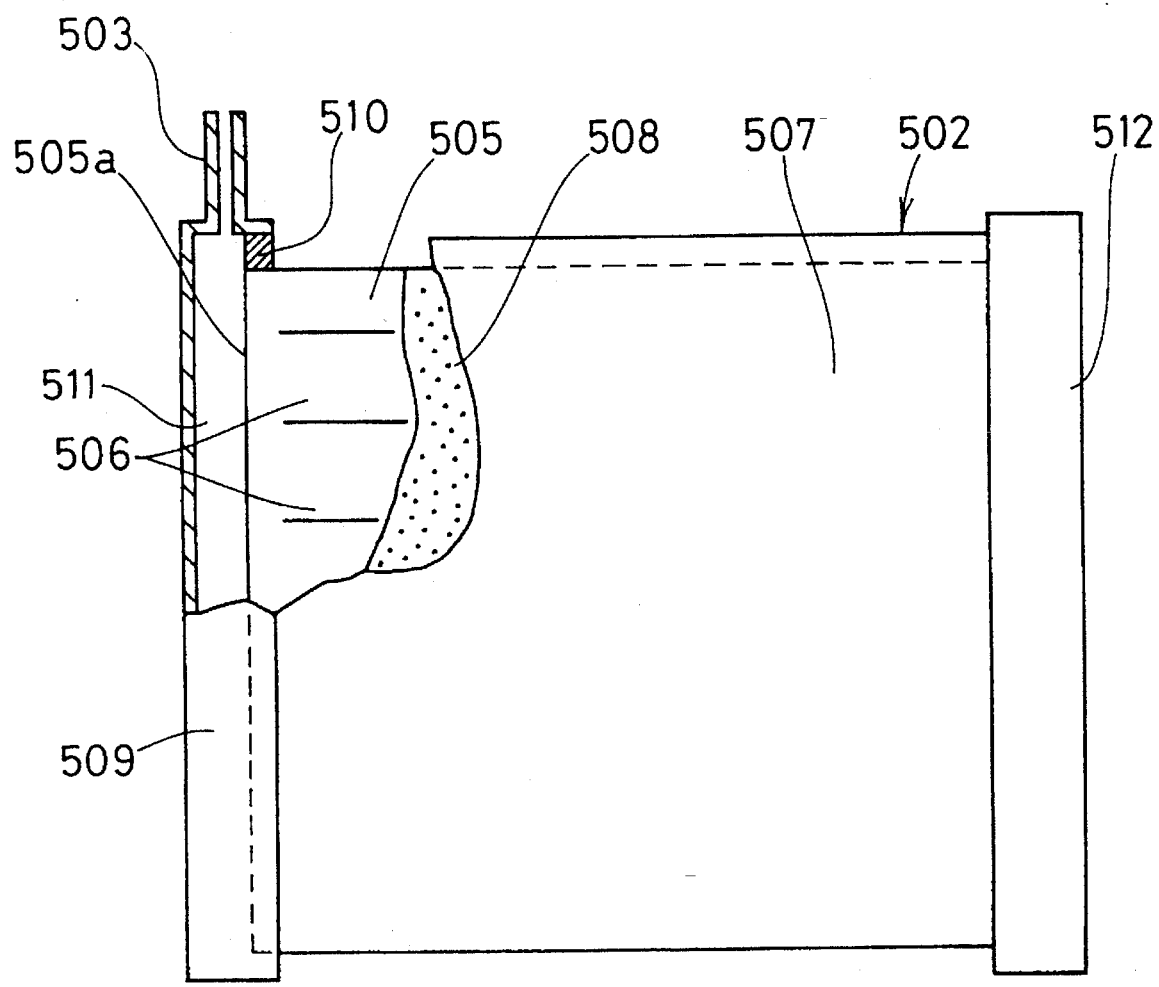
FIG. 26 is a partially cutaway view illustrating a membrane cartridge of aforesaid embodiment.
Figure 27:
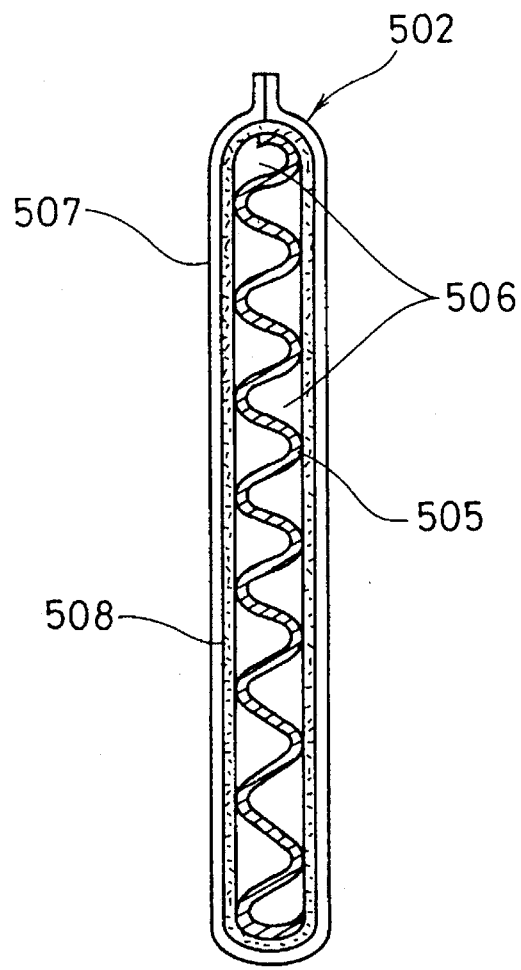
FIG. 27 is a vertical section illustrating aforesaid membrane cartridge.
Figure 28:
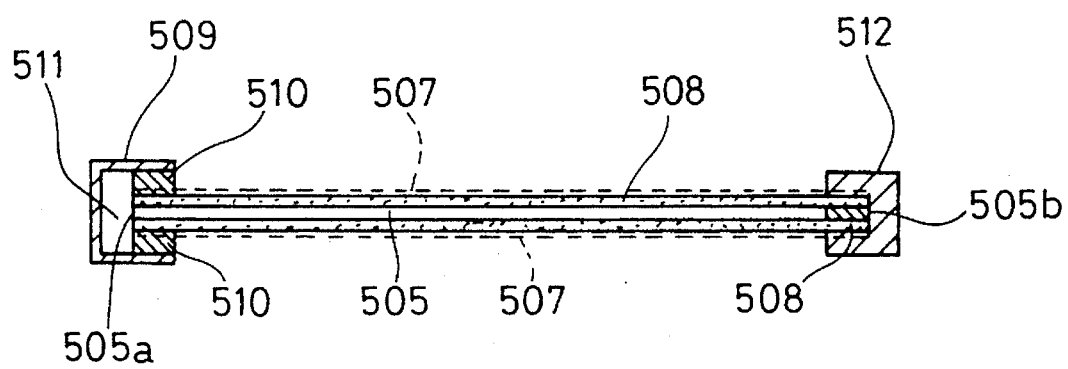
FIG. 28 is a transverse section illustrating aforesaid membrane cartridge.

As shown in FIGS. 21 to 23, the membrane cartridge 401 may comprise a pair of flat plates 404. The flat plate has its opposite sides coupled to the corresponding sides of the other flat plate, while the other two sides thereof form the liquid collecting portions 410 respectively. Specifically, a pair of rectangular flat plates 404, 404 are coupled to each other at the longer sides 404a thereof by means of the coupling support members 405, so as to form the hollow-shaped membrane supporting plate 402. Groove-shaped liquid collecting caps 417 are provided at the shorter sides 404b of the flat plates 404 to form liquid collecting portions 410 inside of the liquid collecting caps 417. An end of the liquid collecting cap 417 is closed with a cap 418, while the suction nozzle 419 is attached to the other end of the liquid collecting cap 417.

The arrangement of this embodiment produces the same action as the previous embodiments. Furthermore, by applying the sucking pressure to the collecting portions 410 at both end sides, the sucking pressure can be evenly applied to the whole surface of the filtration membrane 405 even in a large membrane cartridge.

Another embodiment of the filtration membrane module according to the present invention is shown in FIGS. 24 to 28. According to FIGS. 24 to 28, a filtration membrane module 500 comprises a box frame 501 with the top and bottom thereof made open; plate-like membrane cartridges 502 properly spaced in parallel to each other in the box frame 501; and suction nozzles 503 attached to the membrane cartridges 502 respectively.

The box frame 501 accommodates a diffuser 504 under the membrane cartridges 502 and above the lower opening of the box frame 501. Diffusing ports 504a are provided at the lower part of the diffuser 504.

A membrane supporting plate 505 of the membrane cartridge 502 is made of plastics or stainless steel molded into corrugated sheet, and has a passage 506 of permeated liquid on the surface thereof as well as a filtration membrane 507 covering the surface thereof. A spacer 508 made of felt and the like which has communication apertures in the three-dimensional directions is interposed between the membrane supporting plate 505 and filtration membrane 507. As shown in the figure, the filtration membrane 507 may have a cylindrical form by having the opposite sides thereof adhered to each other.

A prismatic edge support member 509 is disposed at an end of the membrane cartridge 502, concealing an end portion 505a of the membrane supporting plate 505 together with the edge of the filtration membrane 507. The edge support member 509 is slightly wider than the membrane supporting plate 505 and has a predetermined thickness, such that the membrane supporting plate 505 is sealed on its periphery by filling a resin 510 between the filtration membrane 507 and edge support member 509. The edge support member 509 includes therein a space as the liquid collecting portion 511 communicated with both the passage 506 of permeated liquid and suction nozzle 503. The other end portion 505b of the membrane supporting plate 505 together with the edge of the filtration membrane 507 are concealed by a solid-core edge support member 512 having a predetermined thickness and a resin 513.

Utilizing the thickness of the edge support member 509 and solid-core edge support member 512, the membrane cartridges 502 are properly spaced in the box frame 501.

In this arrangement, the aeration gas from the diffusing ports 504 on the diffuser 504 is first spurted downward before it goes up. Accordingly, even if the diffuser 504 is close to the lower end of the membrane cartridges 502, the aeration gas will not swirl but goes up, flowing into the gaps between the membrane cartridges 502 fast enough to prevent the adhesion of sludge to the membrane surfaces.

Since the membrane cartridge 502 has rigidity and is spaced a given distance from the adjoining membrane cartridges 502 by the thickness of the edge support member 509 thereof, the passage width is maintained constant even in a simple arrangement. This allows to take full advantage of the cleaning effect of the gas-liquid cross flow so that a normal volume of the aeration can prevent reduction of filtration length.

Figure 29:
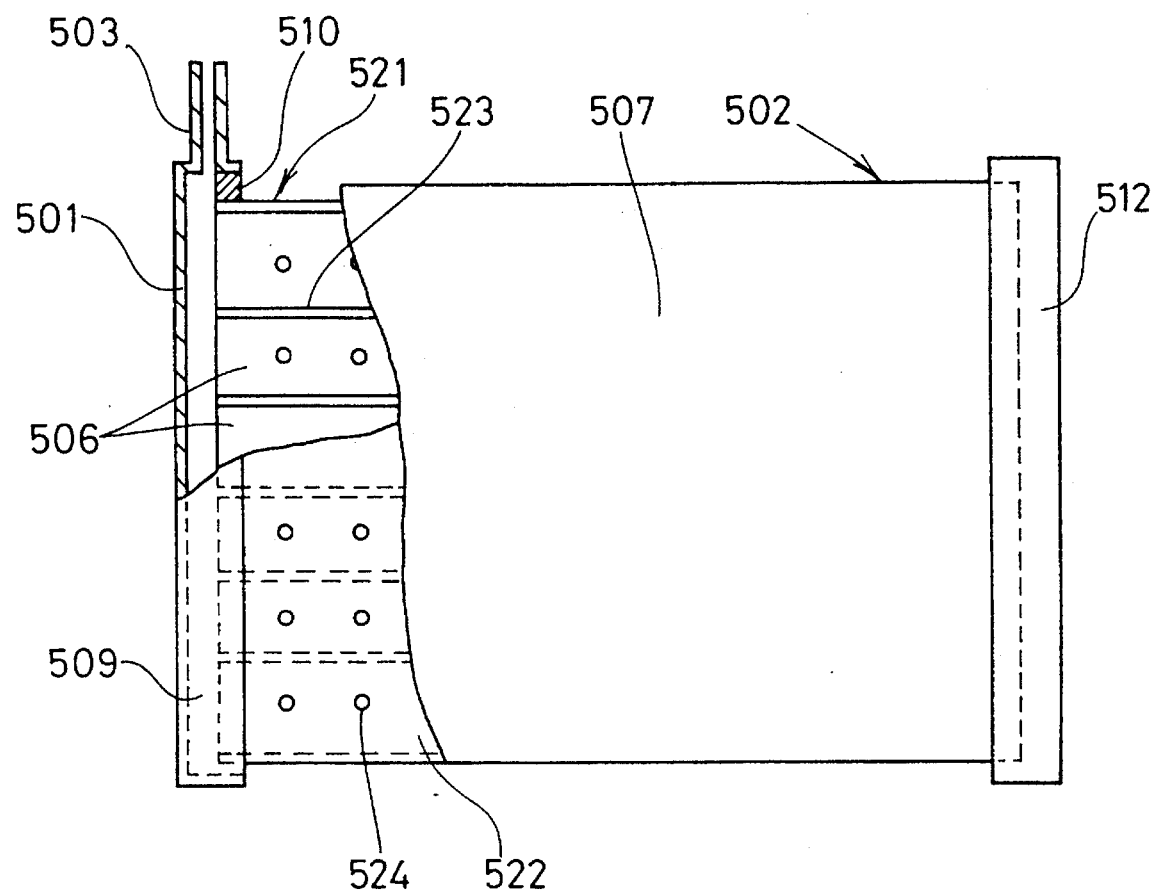
FIG. 29 is a partially cutaway view illustrating a membrane cartridge of still another embodiment according to the present invention.
Figure 30:
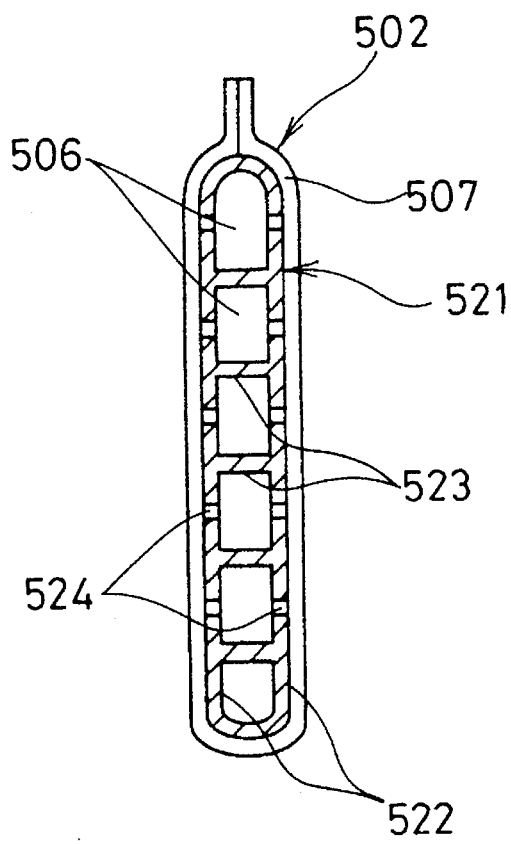
FIG. 30 is a vertical section illustrating aforesaid membrane cartridge.
Figure 31:
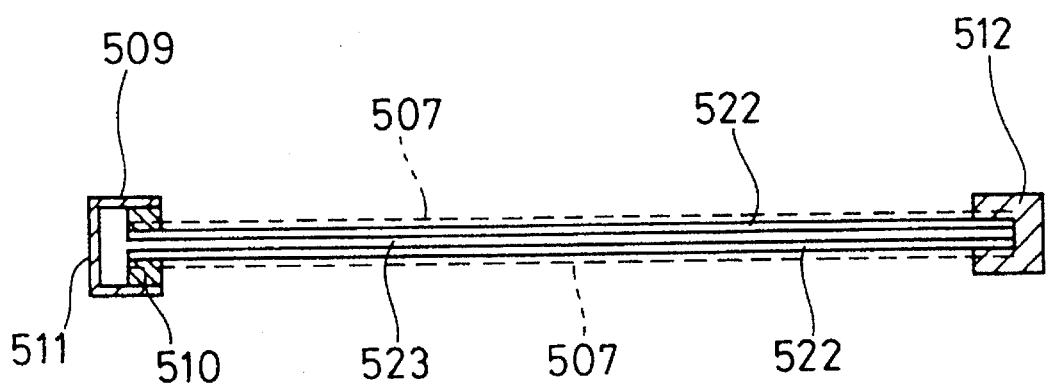
FIG. 31 is a transverse section illustrating aforesaid membrane cartridge.

Alternatively, the membrane cartridge 502 may be arranged as shown in FIGS. 29 through 31. The membrane supporting plate 521 of the membrane cartridge 502 comprises a pair of side walls 522, 522 opposite to each other, which define a hollow therebetween accommodating plural supporting walls 523 bridging the side walls in parallel. This arrangement imparts rigidity to the membrane supporting plate 521 and also defines the passage 506 of permeated liquid in the membrane supporting plate 521. Plural small apertures 524 having a diameter of 1 to 3 mm are provided on the surface of the side walls 522. The membrane supporting plate 521 is covered with the filtration membrane 507. Although this membrane cartridge has no spacer interposed, the spacer may be interposed between the membrane supporting plate 521 and filtration membrane 507 to avoid close contact therebetween.

What is claimed is:

1. A filtration membrane module submerged with a processed liquid in a processing tank comprising;

a plurality of flat, rigid membrane cartridges vertically placed in parallel to each other as properly spaced from the adjoining membrane cartridges;

cleaning stream generating means for supplying a flow parallel to the membrane surfaces of the membrane cartridges which opposes to gaps defined between the membrane cartridges opposite to each other; and sucking means for sucking permeated liquid in each membrane cartridge which is communicated with the passage of permeated liquid in each membrane cartridge;

each membrane cartridge having a membrane supporting plate and a filtration membrane covering the outer surface thereof; and the membrane supporting plate supporting the filtration membrane is being made hollow by using a rigid structural member, the inside of the plate forming a passage of permeated liquid, the membrane supporting plate having an opening formed on the surface opposite to the filtration membrane the opening communicating to the passage of permeated liquid.

2. A filtration membrane module set forth in claim 1, wherein the membrane supporting plate is composed of a rigid frame structure;

the filtration membrane covers opening on the surface of the membrane supporting plate; and a filtration membrane net is interposed between the membrane supporting plate and filtration membrane.

3. A filtration membrane module submerged with a processed liquid in a processing tank comprising:

a plurality of flat, rigid membrane cartridges vertically placed in parallel to each other as properly spaced from the adjoining membrane cartridges;

cleaning stream generating means for supplying a flow parallel to the membrane surfaces of the membrane cartridges which opposes to gaps defined between the membrane cartridges opposite to each other;

sucking means for sucking permeated liquid in each membrane cartridge which is in communication with the passage of permeated liquid in each membrane cartridge; and a membrane supporting plate for retaining a filtration membrane of the membrane cartridge which is made hollow using a rigid structure member;

wherein the membrane supporting plate composing the frame structure is divided into two frame bodies made of molded resin;

protrusions are provided on one of the opposite surfaces where the two frame bodies face to each other, while recesses are provided on the other opposite surface of the other frame body;

the filtration membrane covers the outer surface of each frame body thereby integrally forming the filtration membrane and frame body; and the frame bodies are fixed to each other by fitting the protrusions with the recesses.

4. A filtration membrane module set forth in claim 3, wherein the frame body of the membrane supporting plate comprises bars for retaining the filtration membrane; and the bars include holes to form the passage of permeated liquid.

5. A filtration membrane module submerged with a processed liquid in a processing tank comprising:

a plurality of flat, rigid membrane cartridges vertically placed in parallel properly spaced from the adjoining membrane cartridges;

cleaning stream generating means for supplying a flow parallel to the membrane surfaces of the membrane cartridges which opposes to gaps defined between the membrane cartridges opposite to each other; and sucking means for sucking permeated liquid in each membrane cartridge which is communicated with the passage of permeated liquid in each membrane cartridge;

each membrane cartridge including a membrane supporting plate and and a bag-shaped filtration membrane covering the outer surface of the membrane supporting plate; and the membrane supporting plate comprising plural bar-shaped, rigid membrane supporting frame members disposed in parallel to each other, a coupling frame member disposed as crossed with one end of the membrane supporting frame members to fix the same in one piece, passages of permeated liquid defined in gaps between the respective membrane supporting frame members, and a liquid collecting cap communicated with liquid collecting means and coupling the other end of each membrane supporting frame member.

6. A filtration membrane module set forth in claim 5, wherein the liquid collecting cap is detachably coupled with the other end of each membrane supporting frame member.

7. A filtration membrane module submerged with a processed liquid in a processing tank comprising:

a plurality of flat, rigid membrane cartridges vertically placed in parallel to each other as properly spaced from the adjoining membrane cartridges;

cleaning stream generating means for supplying a flow parallel to the membrane surfaces of the membrane cartridges which opposes to gaps defined between the membrane cartridges opposite to each other; and sucking means for sucking permeated liquid in each membrane cartridge which is in communication with the passage of permeated liquid in each membrane cartridge;

each membrane cartridge comprising:

a pair of plate members with fine apertures or slits disposed therein being coupled to each other on the peripheries thereof so as to form a hollow membrane supporting plate; and plural flat rib members having a width bridging the two plate members, which are disposed in parallel to each other in the membrane supporting plate to form passages of permeated liquid between the respective rib members.

8. A filtration membrane module set forth in claim 7, wherein a spacer interposed between the plate members of a membrane supporting plate and the filtration membrane to form a predetermined gap therebetween; and fine grooves communicated with fine apertures or slits formed in the surfaces of the plate members.

9. A filtration membrane module set forth in any of claims 1 through 8, wherein a diffuser as the cleaning stream generating means is disposed under the membrane cartridges;

diffusing ports are disposed at the lower side of the diffuser;

edge supporting members disposed at opposite end portions of the membrane supporting plate and forming a predetermined gap between the filtration membranes of adjoining membrane cartridges which oppose to each other;

at least one of said edge supporting members is made hollow forming the passage of permeated liquid.

* * * * *